(12) United States Patent
Kim et al.

(10) Patent No.: US 10,935,270 B2
(45) Date of Patent: Mar. 2, 2021

(54) ELECTRONIC DEVICE AND AIR-CONDITIONING CONTROL METHOD THEREFOR

(71) Applicant: Samsung Electronics Co., Ltd., Gyeonggi-do (KR)

(72) Inventors: Kyungjae Kim, Gyeonggi-do (KR); Kwanwoo Song, Gyeonggi-do (KR); Seong Hwan Oh, Gyeonggi-do (KR); Daeeun Yi, Seoul (KR); Jeongil Seo, Seoul (KR); Hunjung Lim, Incheon (KR); Hyejung Cho, Gyeonggi-do (KR); Sunggeun Song, Incheon (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/069,422

(22) PCT Filed: Jan. 16, 2017

(86) PCT No.: PCT/KR2017/000526
§ 371 (c)(1),
(2) Date: Jul. 11, 2018

(87) PCT Pub. No.: WO2017/123074
PCT Pub. Date: Jul. 20, 2017

(65) Prior Publication Data
US 2019/0024926 A1     Jan. 24, 2019

(30) Foreign Application Priority Data
Jan. 14, 2016   (KR) .................. 10-2016-0004791

(51) Int. Cl.
*F24F 11/46* (2018.01)
*F24F 11/64* (2018.01)
(Continued)

(52) U.S. Cl.
CPC .............. *F24F 11/46* (2018.01); *F24F 11/56* (2018.01); *F24F 11/64* (2018.01); *F24F 11/65* (2018.01);
(Continued)

(58) Field of Classification Search
CPC .. F24F 11/46; F24F 11/64; F24F 11/65; F25F 11/56; F25B 30/02; G05B 19/042
(Continued)

(56) References Cited

U.S. PATENT DOCUMENTS

2010/0249955 A1 *   9/2010   Sitton ................... G05B 15/02
                                                                    700/33
2011/0056673 A1    3/2011   Jang et al.
(Continued)

FOREIGN PATENT DOCUMENTS

CN       103189687       7/2013
CN       103453614       12/2013
(Continued)

OTHER PUBLICATIONS

Wikipedia, Building Automation, revision Nov. 23, 2015, Wikimedia foundation, retrieved from http://en.wikipedia.org/w/index.php?title=Building_automation&oldid=692120330 on Sep. 27, 2019 (Year: 2015).*

(Continued)

*Primary Examiner* — Ziaul Karim
*Assistant Examiner* — Joshua T Sanders
(74) *Attorney, Agent, or Firm* — The Farrell Law Firm, P.C.

(57) ABSTRACT

An air-conditioning control method for an electronic device is provided that includes determining a rate of temperature change on the basis of changes in the temperature measured for the first time; acquiring first density information on the basis of the determined rate of temperature change and (Continued)

information on a location at which the temperature change is measured; and controlling air-conditioning according to the first density information.

10 Claims, 22 Drawing Sheets

(51) Int. Cl.
*F24F 11/56* (2018.01)
*G06Q 50/10* (2012.01)
*F25B 13/00* (2006.01)
*F25B 49/00* (2006.01)
*F24F 11/65* (2018.01)
*F25B 30/02* (2006.01)
*G05B 19/042* (2006.01)
*F24F 110/10* (2018.01)
*F24F 120/12* (2018.01)
*F24F 140/60* (2018.01)
*F24F 140/50* (2018.01)

(52) U.S. Cl.
CPC .............. *F25B 13/00* (2013.01); *F25B 30/02* (2013.01); *F25B 49/00* (2013.01); *G05B 19/042* (2013.01); *G06Q 50/10* (2013.01); *F24F 2110/10* (2018.01); *F24F 2120/12* (2018.01); *F24F 2140/50* (2018.01); *F24F 2140/60* (2018.01); *G05B 2219/2614* (2013.01)

(58) Field of Classification Search
USPC .......................................................... 700/276
See application file for complete search history.

(56) References Cited

U.S. PATENT DOCUMENTS

| | | | |
|---|---|---|---|
| 2012/0310417 | A1 | 12/2012 | Enohara et al. |
| 2015/0120235 | A1 | 4/2015 | Steinberg et al. |
| 2015/0167999 | A1* | 6/2015 | Seem ...................... F24F 11/30 700/276 |
| 2017/0051937 | A1 | 2/2017 | Toyoshlma et al. |
| 2017/0268795 | A1* | 9/2017 | Yamamoto ............... F24F 11/62 |

FOREIGN PATENT DOCUMENTS

| | | |
|---|---|---|
| CN | 103776133 | 5/2014 |
| CN | 104296333 | 1/2015 |
| CN | 104315676 | 1/2015 |
| GB | 2 260 830 | 4/1993 |
| GB | 2 450 357 | 12/2008 |
| JP | 09060944 | 3/1997 |
| JP | 2011185542 | 9/2011 |
| JP | 2011185542 A * | 9/2011 |
| JP | 2013040693 | 2/2013 |
| JP | 2015137793 | 7/2015 |
| JP | 2015137793 A * | 7/2015 |
| KR | 1020110020065 | 3/2011 |
| KR | 101117496 | 2/2012 |
| KR | 1020140088258 | 7/2014 |
| WO | WO 2015/170414 | 12/2015 |

OTHER PUBLICATIONS

Ebadat, Afrooz, et al. "Estimation of building occupancy levels through environmental signals deconvolution." Proceedings of the 5th ACM Workshop on Embedded Systems for Energy-Efficient Buildings. 2013. (pp. 1-8) retrieved from: https://dl.acm.org/doi/abs/10.1145/2528282.2528290 on Apr. 25, 2020 (Year: 2013).*
Viani, Federico, et al. "Crowd detection and occupancy estimation through indirect environmental measurements." The 8th European conference on antennas and propagation (EuCAP 2014). IEEE, 2014.(pp. 2127-2130) retrieved from: https://ieeexplore.ieee.org/abstract/document/6902229 on Apr. 25, 2020. (Year: 2014).*
European Search Report dated Oct. 11, 2018 issued in counterpart application No. 17738703.2-1008, 10 pages.
PCT/ISA/210 Search Report issued on PCT/KR2017/000526 (pp. 3).
PCT/ISA/237 Written Opinion issued on PCT/KR2017/000526 (pp. 8).
Chinese Office Action dated Dec. 31, 2019 issued in counterpart application No. 201780006816.7, 22 pages.

* cited by examiner

ELECTRONIC DEVICE AND AIR-CONDITIONING CONTROL METHOD THEREFOR

PRIORITY

This application is a National Phase Entry of PCT International Application No. PCT/KR2017/000526 which was filed on Jan. 16, 2017, and claims priority to Korean Patent Application No. 10-2016-0004791, which was filed on Jan. 14, 2016, the content of each of which is incorporated herein by reference.

TECHNICAL FIELD

The present invention relates to an electronic device and an air-conditioning control method thereof. More particularly, the present invention proposes an electronic device and method for efficiently controlling cooling/heating according to an environment of a space.

BACKGROUND ART

The Internet is evolving from a human-centric network, in which humans generate and consume information, into an Internet of things (IoT) network in which distributed things exchange and process information. Further, the IoT technology combines with big data processing technology through connection with a cloud server or the like, thus developing into Internet of everything (IoE) technology. In order to realize the IoT, relevant technologies such as sensing technology, wired/wireless communication, network infrastructure, service interface technology, and security technology are required. Thus, recently, technologies such as a sensor network, machine-to-machine (M2M), and machine type communication (MTC) are studied.

In the IoT environment, an intelligent Internet technology (IT) service can be provided that collects and analyzes data generated from connected things and thereby creates new value in a human life. The IoT can be applied to fields of smart home, smart building, smart city, smart car or connected car, smart grid, health care, smart home appliance, and advanced medical service through the fusion of existing information technology (IT) and various industries.

Meanwhile, in the IoT environment, there is a necessity of a method for efficiently controlling a temperature while maximizing energy efficiency, depending on whether a heating entity exists in a space, and according to a temperature of an ambient air.

Specifically, there is a need for an invention capable of reducing energy consumption while offering user's comfort in consideration of various factors rather than simply controlling an air conditioner so that a temperature of a space is adjusted to a setting temperature.

DISCLOSURE OF INVENTION

Technical Problem

It is an object of the present invention is to provide an electronic device and method for controlling the cooling and heating of a space, based on at least one of the density of the space and the temperature of an ambient air.

Solution to Problem

According to an embodiment of the present invention, an air-conditioning control method of an electronic device may comprise steps of determining a temperature change rate, based on a temperature change measured for a first time, acquiring first density information, based on the determined temperature change rate and location information about a location at which the temperature change is measured, and controlling air-conditioning according to the first density information.

According to another embodiment of the present invention, an electronic device for air-conditioning control may comprise a controller configured to determine a temperature change rate, based on a temperature change measured for a first time, to acquire first density information, based on the determined temperature change rate and location information about a location at which the temperature change is measured, and to control air-conditioning according to the first density information.

Advantageous Effects of Invention

According to an embodiment of the present invention, the electronic device can efficiently control cooling/heating, based on at least one of the density of a space and the temperature of an ambient air.

MODE FOR THE INVENTION

Hereinafter, various embodiments of the present disclosure are described with reference to the accompanying drawings. It should be understood that embodiments and terminology used therein are not intended to limit the disclosed technique to particular implementation, but various modifications, equivalents, and/or alternatives of the embodiments are included. In the following description of embodiments, descriptions of techniques that are well known in the art and not directly related to the present invention are omitted. This is to clearly convey the subject matter of the present invention by omitting an unnecessary explanation.

The expressions including ordinal numbers, such as "first" and "second," may indicate various elements. The above expressions do not limit the sequence or importance of the elements, and are used merely for the purpose to distinguish one element from the others.

Terms used herein may be merely to describe a certain embodiment, and may not be intended to limit the scope of other embodiments. The singular expressions may include plural expressions unless the context clearly dictates otherwise. In this disclosure, the terms such as "comprise", "include", and "have" denote the presence of stated elements, components, operations, functions, features, and the like, but do not exclude the presence of or a possibility of addition of one or more other elements, components, operations, functions, features, and the like.

The term "module" or "unit" in embodiments may perform at least one function or operation and may be implemented in hardware, software, or a combination of hardware and software. In addition, a plurality of "modules" or a plurality of "units" may be integrated into at least one module and implemented by at least one processor (not shown) except "a module" or "a unit" which needs to be implemented by specific hardware.

Figure 1:
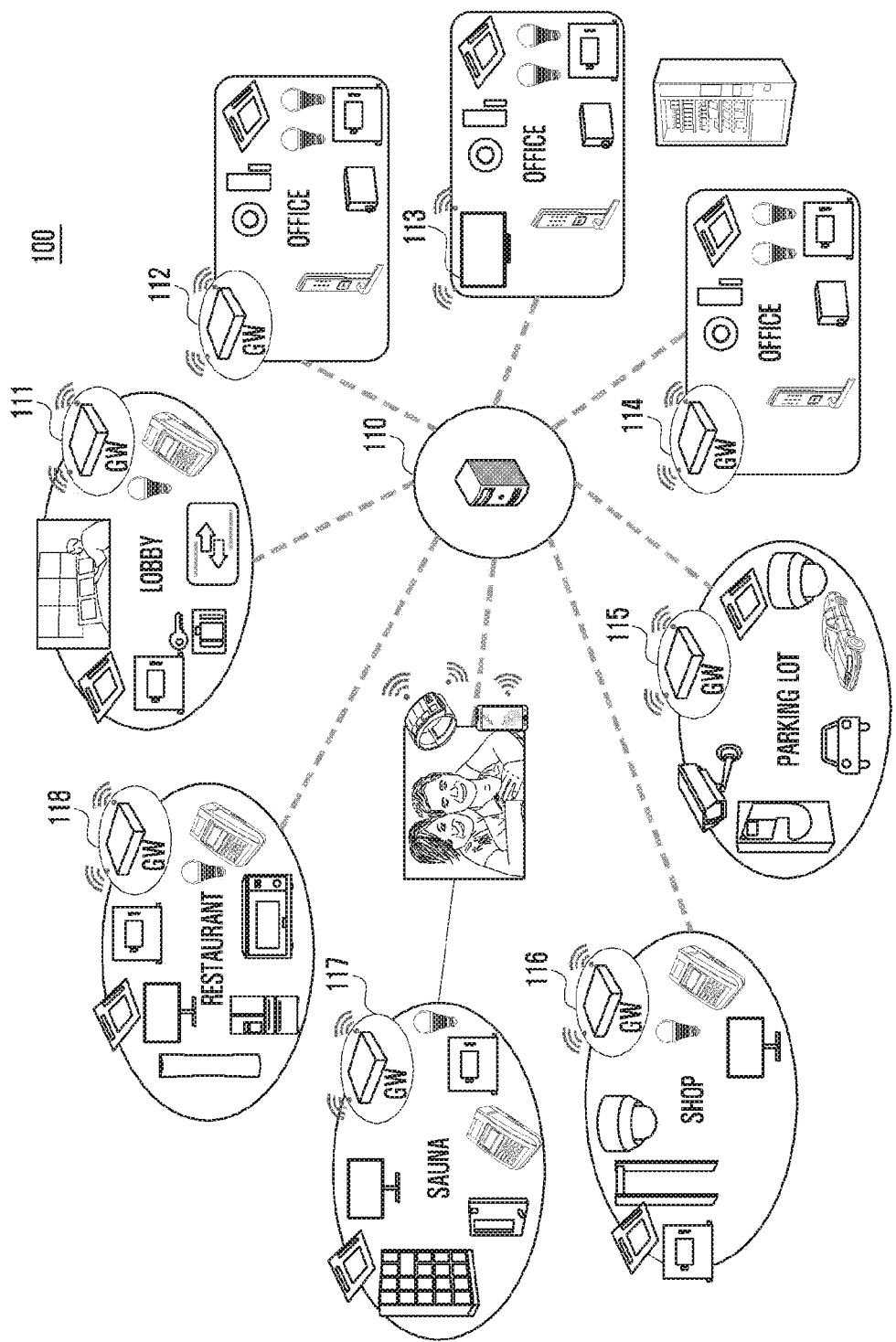
FIG. 1 is a diagram illustrating an air conditioning control system according to an embodiment of the present invention.

FIG. 1 is a diagram illustrating an air conditioning control system 100 according to an embodiment of the present invention. Specifically, in an embodiment, FIG. 1 shows a single building divided into spaces for various functions and the air conditioning (i.e., cooling and heating) control system for controlling air conditioners of the building.

For example, as shown in FIG. 1, there may exist a control device 110 for controlling an air conditioning system of a building. Although FIG. 1 shows one control device 110, this is merely exemplary. Depending on the size of a building or system or a control method of the building or system, one or more electronic devices may exist.

In addition, the control device 110 may include a storage for storing various kinds of information. Alternatively, the control device 110 may perform communication with a separate storage server that stores various kinds of information.

A building divided into a restaurant, a lobby, an office, and the like may include electronic devices 111 to 118, such as a gateway (GW), for receiving control commands for controlling air conditioners in divided spaces from the control device 110, and for transmitting information about environments of the divided spaces to the control device 110.

Meanwhile, according to another embodiment of the present invention, the control device 110 for controlling an air conditioner may exist in each divided space. In this case, each control device 110 may receive information from a server of the system 100 and control an air conditioning system of each space according to the received information.

Specifically, in the present invention, a method for controlling cooling and heating, based on at least one of the density of a control target space and the temperature of an ambient air of the space will be described.

Figure 2:
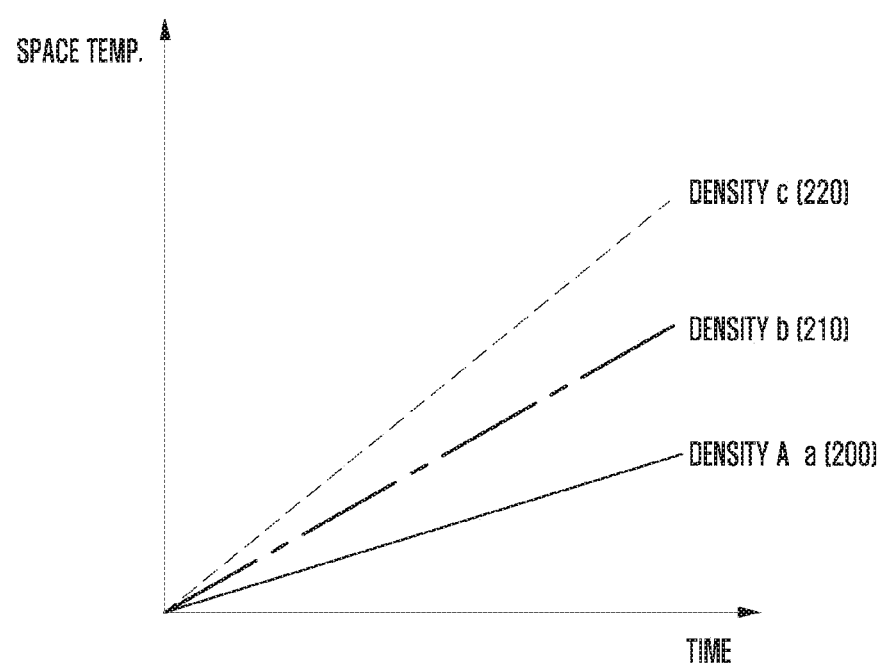
FIG. 2 is a graph showing a temperature rise rate according to a density.

As shown in FIG. 2, if no cooling is performed in summer, the temperature of a space rises with time. Further, if the number of heating entities increases in the space, a rising rate of the space temperature may also increase.

Hereinafter, information about the ratio occupied by heating entities with respect to the area of a space controlled by an electronic device is defined as density information. For example, the heating entity may be a person. Thus, the density of a space may be proportional to the number of persons that exist in the space. Also, the density of a space may be information about the ratio of the number of currently existing persons in the space to the maximum number of persons that can be accommodated in the space.

What the heating entity is a person is merely exemplary. Additionally, the heating entity may be various kinds of devices that generate heat when used. For example, the heating entity that exists in a home may include a person, a refrigerator, a TV, a sound device, an illuminator, and the like.

As shown in FIG. 2, in summer, a rising rate of temperature of a certain space with a fixed size becomes higher as the density increases from a density a 200 to a density c 220.

Also, in case of the density c 220 in comparison with case of the density a 200, it takes a longer time for the temperature of the space to decrease by cooling.

Meanwhile, not only density but also conditions of a space and an outside temperature (the temperature of an ambient air) may affect the rate of temperature rise in the space. For example, a space surrounded by concrete walls and a space surrounded by glass walls may have different rates of temperature change. Also, even in the same space that is set to a temperature of 21 degrees and in which an air conditioner is in operation, it takes more time and energy to reach the setting temperature of 21 degrees when the ambient air temperature is 30 degrees than when the ambient air temperature is 20 degrees.

Figure 3A:
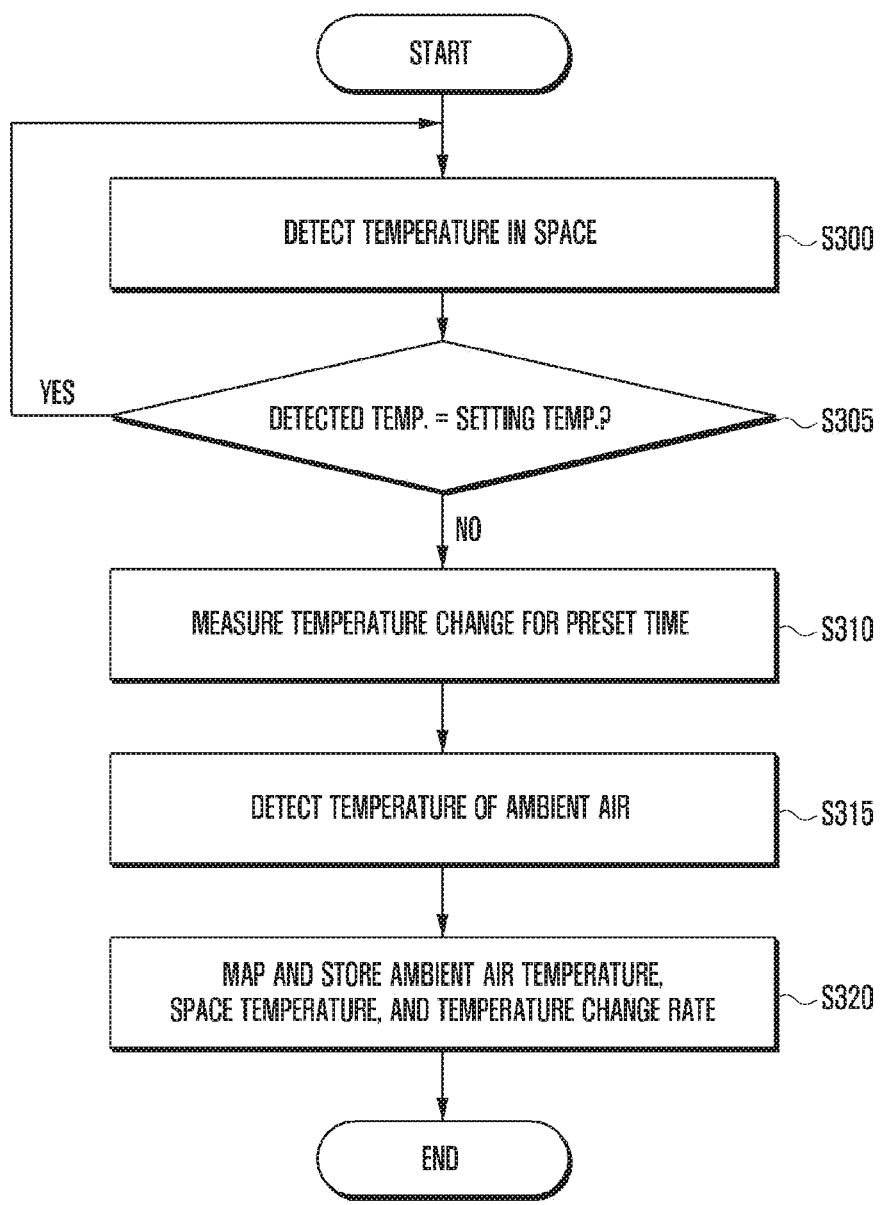
FIGS. 3A and 3B are flow diagrams illustrating a method for measuring and storing a temperature of an ambient air, a current temperature of a space, and a rate of a temperature change according to an embodiment of the present invention.
Figure 3B:
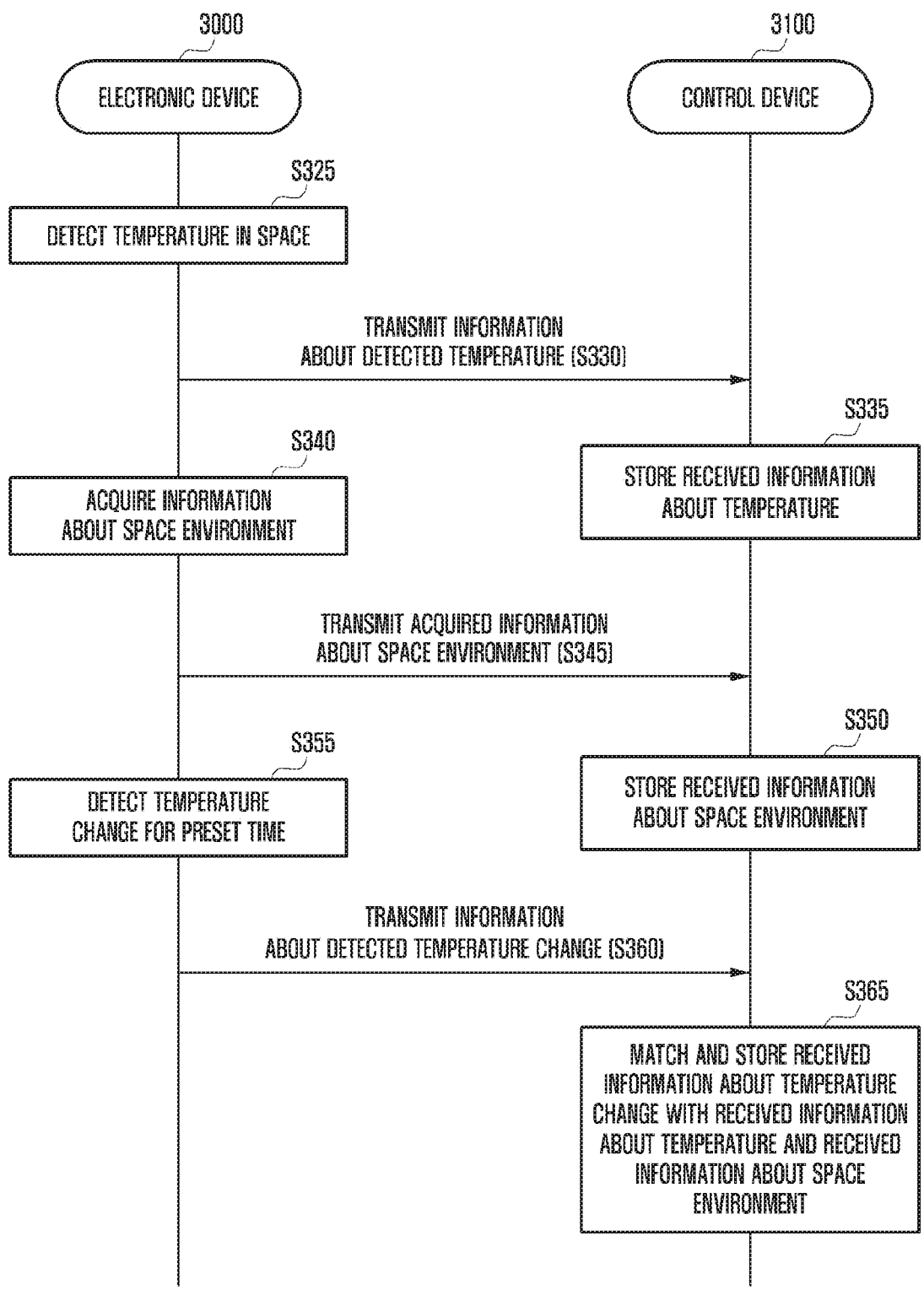

On the other hand, if no heating is performed in winter, the temperature of a space lowers with time. Further, if the number of heating entities increases in the space, a lowering rate of the space temperature may decrease. Thus, in winter, when the density is smaller, it takes a shorter time for the temperature of the space to increase by heating. Therefore, in the present invention, a method for controlling the cooling and heating of the space by considering at least one of the density of the space, the conditions of the space, and the temperature of an ambient air will be described in detail. FIGS. 3A and 3B are flow diagrams illustrating a method for measuring and storing a temperature of an ambient air, a current temperature of a space, and a rate of a temperature change according to an embodiment of the present invention.

Specifically, FIG. 3A is a flow diagram illustrating a method for storing data at an electronic device that exists in each space.

First, at step S300, the electronic device that controls the cooling and heating of a space may detect a temperature in the space. For example, the electronic device may include a temperature sensor or the like and, using it, detect the temperature in the space. The electronic device may include a plurality of temperature sensors at certain intervals depending on the area of the space.

At step S305, the electronic device may determine whether the detected space temperature is equal to a setting temperature. If not, at step S310, the electronic device may measure a temperature change for a preset time. Thus, the electronic device may determine a rate of temperature change.

Then, at step S315, the electronic device may detect a temperature of an ambient air. Also, the electronic device may map and store the current temperature, the temperature change rate (e.g., a temperature variation for a preset time from the current temperature), and the detected ambient air temperature.

Thus, at step S320, the electronic device may map and store the ambient air temperature, the space temperature, and the temperature change rate.

In addition, the electronic device may map and store the ambient air temperature, the space temperature, and the temperature change rate with density information or the like.

For example, the electronic device of each space may know the number of persons in the space while collecting the above data. In an embodiment, if the space (e.g., an office or a conference room) requires an input of identification information for entry, the electronic device may know the number of persons existing in the space, based on the input of identification information.

According to another embodiment, the electronic device may have a separate sensor and estimate the number of persons by using information that can be sensed from a person or a mobile device possessed by the person.

The electronic device that determines the number of persons in the above manner may map and store the number of persons (density information) with the ambient air temperature, the space temperature, and the temperature change rate.

Meanwhile, FIG. 3B is a diagram illustrating a method for an electronic device existing in each space to transmit data to be stored to a control device.

First, at step S325, the electronic device 3000 may detect a temperature in a space as described above. Then, at step S330, the electronic device 3000 may transmit information about the detected temperature to the control device 3100.

The control device 3100 is an apparatus for receiving information from the electronic devices existing in respective spaces and transmitting commands for controlling an air conditioner to each electronic device or transmitting control commands directly to the air conditioner. For example, the control device 3100 may exist in each building.

At step S335, the control device 3100 may store the received information about the temperature.

At step S340, the electronic device 3000 may acquire information about an environment of the space. This environmental information may include various kinds of information about the environment of the space in which the electronic device 3000 exists.

Firstly, the environmental information may include information about usage of devices in the space. If there are many devices such as a computer, a printer, a copier, a TV, a refrigerator, and an illuminator in the space, the amount of heat generated may increase, and thus the rate of temperature rise may increase in the space.

Therefore, the electronic device 3000 may acquire the in-space device usage information as a factor of raising the space temperature.

For example, the electronic device 3000 may measure the energy usage in the space. Then, based on an average value of the measured energy usage, the electronic device 3000 may predict the number of devices existing in the space.

Also, the user may be allowed to directly enter information about the number of devices in the electronic device 3000.

Meanwhile, with the growth of home network technology, devices existing in the space may be connected to each other in one network. Thus, based on the number of devices accessing the network, the electronic device 3000 may acquire the information about the number of devices within the space.

Secondly, the environmental information may include situation information of the space. For example, if the space is an office, information such as a worker's attendance, a worker's departure, a cleaning time, and an outsider's visit may be acquired. For example, the electronic device may acquire information about a worker's attendance or departure from a commute device equipped in the office. Also, from a user's input, the electronic device may acquire information such as a worker's attendance, a worker's departure, a cleaning time, and an outsider's.

Thirdly, the environmental information may include external situation information of the space. For example, the electronic device may acquire weather information such as sunshine, snow, rain, and wind, including the temperature of an ambient air.

At step S345, the electronic device 3000 may transmit the above-described information about various environments to the control device 3100. Then, at step S350, the control device 3100 may store the information about the space environment received from the electronic device 3000.

At step S355, the electronic device 3000 may detect a temperature change for a preset time. For example, using at least one temperature sensor, the electronic device 3000 may detect the temperature change of the space.

Then, at step S360, the electronic device 3000 may transmit information about the detected temperature change to the control device 3100. For example, if the electronic device 3000 detects that the space temperature has changed by 2 degrees for 10 minutes, the electronic device 3000 may offer the control device 3100 information indicating that the temperature change rate per minute is 0.2 degrees.

At step S365, the control device 3100 may match the received information about the temperature change with both the previously received information about the temperature and the previously received information about the space environment and then store them. Also, the control device

3100 may receive the above-described information from a plurality of electronic devices. Therefore, for each space, the control device 3100 may match and store the space environment information and the temperature change rate information. Although the control device 3100 may include a storage therein to store the above-described information, this is exemplary only. The control device 3100 may also store data in a separate storage server.

Meanwhile, according to still another embodiment, the above-described electronic device or control device may also map and store information about a change in temperature occurring while the air conditioner is running.

The following is an example in which the electronic device further maps and stores information about a temperature change. If the maximum number of persons that can be accommodated in the space is x persons, and if the number of persons currently existing in the space is 0.5× persons, the electronic device may determine that the density is 0.5. In addition, the electronic device may detect a current temperature of 25 degrees and an ambient air temperature of 32 degrees. In this case, if the temperature rises rapidly to 27 degrees within a reference time of 1 minute at a density of 0.5, the electronic device may determine that the temperature rising rate is 2 degrees per minute.

If the air conditioner is operated to the "maximum" at a temperature of 27 degrees and thereby the setting temperature becomes 21 degrees after 10 minutes, the electronic device may map and store a current temperature of 25 degrees, a temperature rising rate of 2 degrees per minute, an ambient air temperature of 32 degrees, a density of 0.5, and a reduction of 6 degrees for 10 minutes at the "maximum" cooling.

The electronic device may include a storage. Thus, the electronic device may store such mapped information in the storage.

Meanwhile, the electronic device may transmit the determined data to the control device as described above. Accordingly, as will be described later, the control device may determine at least one of the density of a space, the rate of a temperature change, and the temperature of an ambient air, determine the degree of cooling/heating control by using the stored information in case of controlling the cooling/heating in response to a result of determination, and transmit commands for controlling the air conditioner to the electronic device.

Figure 4A:
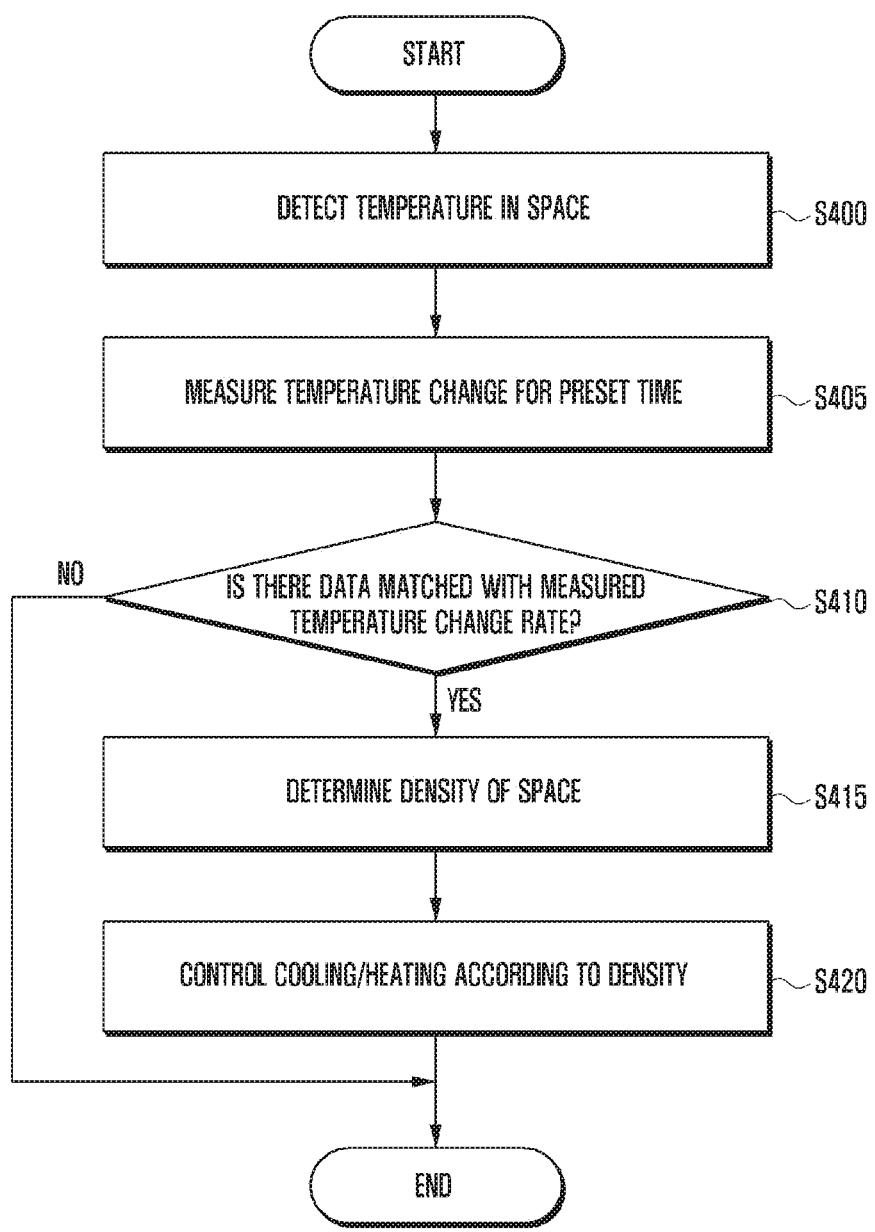
FIGS. 4A and 4B are flow diagrams illustrating a method for determining a density and controlling cooling/heating based on the determined density according to an embodiment of the present invention.
Figure 4B:
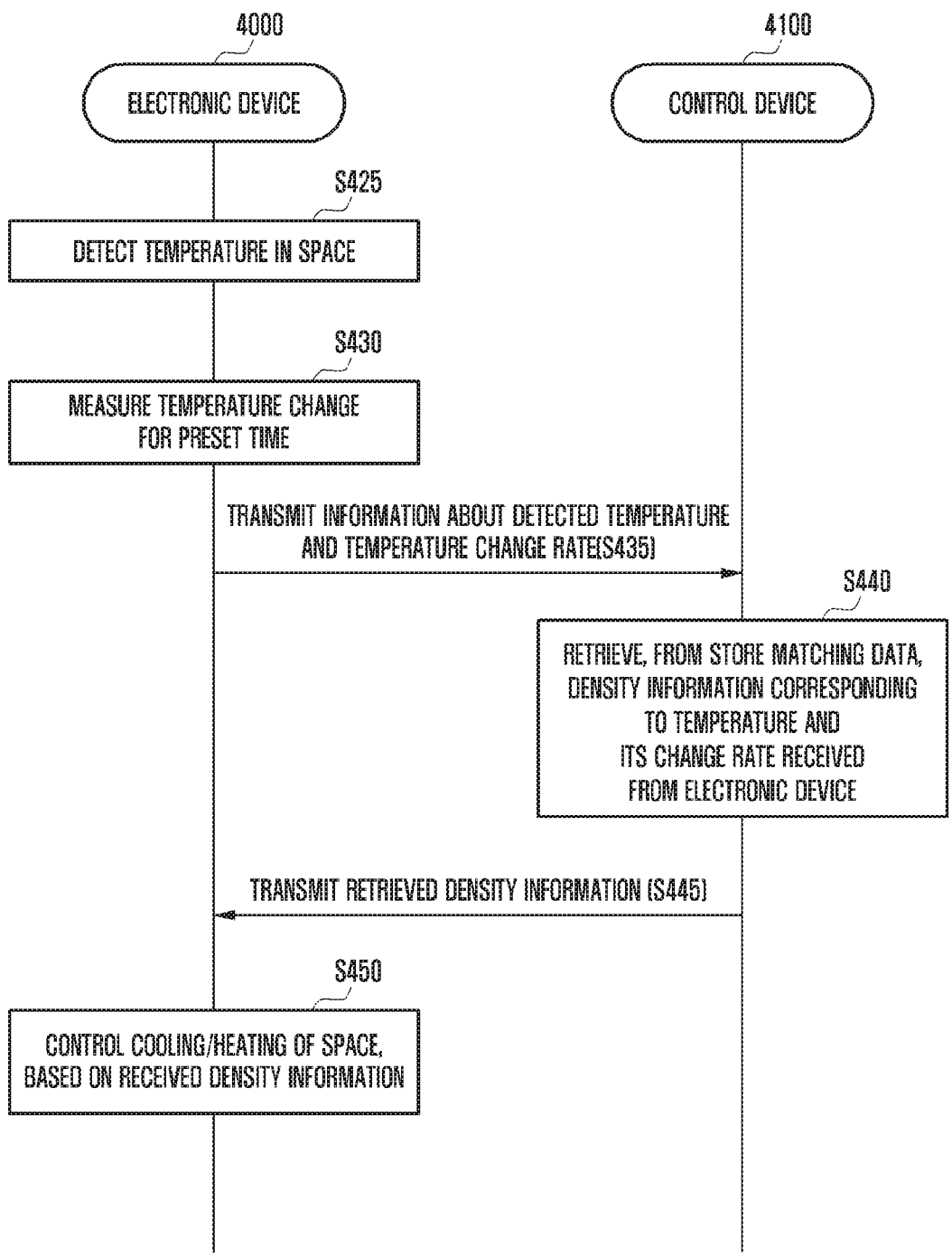

FIGS. 4A and 4B are flow diagrams illustrating a method for determining a density and controlling cooling/heating based on the determined density according to an embodiment of the present invention.

At step S400, the electronic device may detect a temperature in a space. Then, at step S405, the electronic device may measure a temperature change for a preset time. For example, if the time to measure the temperature change is set to one minute, the electronic device may measure how much the temperature has changed for one minute.

Then, at step S410, the electronic device may determine whether there is data matched with the measured temperature change rate. When the electronic device stores mapping information of the ambient temperature, the space temperature, the temperature change rate, and the density as described above, the electronic device may retrieve, from the stored data, data matched with the measured temperature change rate.

If there is matched data, or if there is data whose error is within an allowable range, the electronic device may determine the density of the space at step S415.

For example, the electronic device may detect a current temperature (a starting point of a temperature change) of 25 degrees, an ambient air temperature of 32 degrees, and a temperature rising rate of 2 degrees for 10 minutes. In this case, the electronic device may have stored data that indicates a density of 0.2 when the temperature is raised by 1 degree for 10 minutes, a density of 0.4 when the temperature is raised by 1.5 degrees, and a density of 0.5 when the temperature is raised by 2 degrees on condition that the current temperature is 25 degrees and the ambient air temperature is 32 degrees. Therefore, from the above data, the electronic device may determine that the density is 0.5 because the temperature change rate is an increase of 2 degrees for 10 minutes.

On the other hand, the electronic device may detect a current temperature (a starting point of a temperature change) of 17 degrees, an ambient air temperature of 0 degree, and a temperature lowering rate of 2 degrees for 10 minutes. In this case, the electronic device may have stored data that indicates a density of 0.5 when the temperature is lowered by 1 degree for 10 minutes, a density of 0.4 when the temperature is lowered by 1.5 degrees, and a density of 0.2 when the temperature is lowered by 2 degrees on condition that the current temperature is 17 degrees and the ambient air temperature is 0 degree. Therefore, from the above data, the electronic device may determine that the density is 0.2 because the temperature change rate is a decrease of 2 degrees for 10 minutes.

Then, at step S420, the electronic device may control the cooling and heating, based on the density. For example, the electronic device may determine the strength of cooling and heating in proportion to or in inverse proportion to the density. Since it may be interpreted that many persons are in the space when the density is large, the electronic device may control the strength of cooling to be increased as the density increases. On the other hand, in winter, since it may be interpreted that a temperature lowering speed of the space is high when the density is small, the electronic device may control the strength of heating to be increased as the density decreases.

Alternatively, the electronic device may store in advance setting values for controlling the air conditioner at respective densities in the space, and may control the air conditioner in accordance with the determined density.

For example, if the density is 0.5 and the ambient air temperature is 32 degrees, the electronic device may acquire, from the storage, information that the cooling should be performed to the "maximum". Then, based on the acquired information, the electronic device may perform the cooling to the "maximum".

Alternatively, the electronic device may receive setting values for controlling the air conditioner at respective densities from a separate control device or storage server. For example, the electronic device may transmit information about a density of 0.5 and an ambient air temperature of 32 degrees to the control device or storage server. Then, the electronic device may receive, from the control device or storage server, a control command that the cooling should be performed to the "maximum" at a density of 0.5 and an ambient air temperature of 32 degrees. Therefore, the electronic device may control the air conditioner according to the received control command.

In another example, if the density is 0.5 and the ambient air temperature is 0 degree, the electronic device may acquire, from the storage, information that the heating should be performed on a "slightly weak" level. Then, based on the acquired information, the electronic device may perform the heating on a "slightly weak" level.

Alternatively, the electronic device may receive setting values for controlling the air conditioner at respective densities from a separate control device or storage server. For example, the electronic device may transmit information about a density of 0.5 and an ambient air temperature of 0 degree to the control device or storage server. Then, the electronic device may receive, from the control device or storage server, a control command that the heating should be performed on a "slightly weak" level at a density of 0.5 and an ambient air temperature of 0 degree. Therefore, the electronic device may control the air conditioner according to the received control command.

Hereinafter, the description will be made on the assumption that the temperature rising rate increases as the density becomes higher in summer. However, this is merely exemplary, and the following description may also be applied to winter in which the temperature lowering rate decreases as the density becomes higher.

Meanwhile, FIG. 4B is a sequence diagram illustrating a method for an electronic device to acquire density information from a control device, according to another embodiment of the present invention.

At step S425, the electronic device 4000 may detect a temperature in a space. Then, at step S430, the electronic device 4000 may measure a temperature change for a preset time.

At step S435, the electronic device 4000 may transmit information about the detected temperature and a temperature change rate to the control device 4100. The control device 4100 is an apparatus for receiving information from the electronic devices existing in respective spaces and transmitting commands for controlling an air conditioner to each electronic device or transmitting control commands directly to the air conditioner. For example, the control device 4100 may exist in each building.

The control device 4100 may include a storage for mapping and storing information about each space temperature, a temperature change rate, an ambient air temperature, and a density. Alternatively, the control device 4100 may perform communication with a separate storage server for mapping and storing the above information.

Therefore, at step S440, the control device 4100 may retrieve, from the storage or the external storage server, the density information corresponding to the temperature and temperature change rate received from the electronic device. Then, at step S445, the control device 4100 may transmit the retrieved density information to the electronic device 4000.

At step S450, the electronic device 4000 may control the cooling/heating of the space, based on the received density information.

As described above, the electronic device 4000 may receive, from the control device 4100, not only the density information but also an air conditioning control command corresponding to the determined density information.

Figure 5:
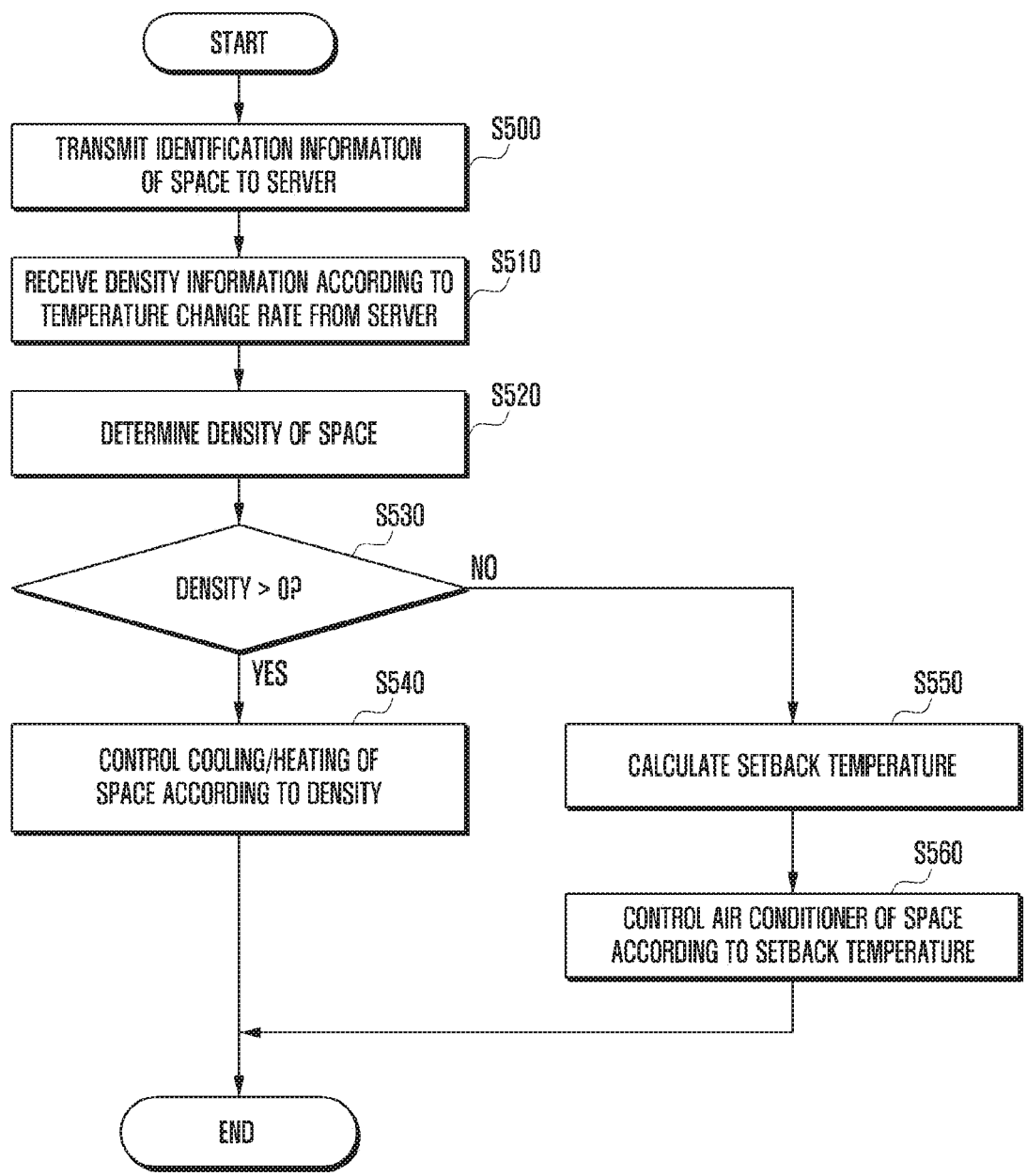
FIG. 5 is a flow diagram illustrating a method for determining a density and controlling cooling/heating based on the determined density, in case where identification information of a space is known, according to an embodiment of the present invention.

FIG. 5 is a flow diagram illustrating a method for determining a density and controlling cooling/heating based on the determined density, in case where identification information of a space is known, according to an embodiment of the present invention.

When storing mapping information as described above, the electronic device may further map and store identification information of a space for which the cooling and heating will be controlled. For example, the electronic device may map and store an ID of the space, a temperature of an ambient air, a detected temperature, a temperature change rate, and density information together.

Even in case of spaces located in the same building, the temperature change rates thereof based on the number of persons may be different depending on whether the space is a conference room or a restaurant. Therefore, in order to acquire suitable air conditioning control information for a target space, the electronic device may map and store the identification information of the space together with the above temperature-related information and the density information.

At step S500, the electronic device may transmit identification information of a space to the control device or storage server. For example, the electronic device may transmit an ID of the space to the control device or storage server.

The control device or storage server that receives the ID of the space may retrieve the density information and the temperature-related information in a space corresponding to the received ID. Then, the control device or storage server may transmit the retrieved density information and temperature-related information to the electronic device.

Thus, at step S510, the electronic device may receive the density information according to a temperature change rate from the server.

Based on the received information, the electronic device may determine the density of the space at step S520. Then, at step S530, the electronic device may determine whether the density is greater than zero.

A density greater than zero may indicate that there is one or more persons in the space. Thus, at step S540, the electronic device may control the cooling and heating of the space in accordance with the density.

Specifically, when receiving the ID of a space A, the control device or storage server may retrieve information indicating that when the ambient air temperature is 28 degrees in case of the space A, the cooling strength is controlled to a "slightly weak" level at a density of 0.1 to 0.2, to a "medium" level at a density of 0.3, to a "strong" level at a density of 0.5, and to a "strongest" level at a density of 0.6 to 0.8. Then, the retrieved information may be transmitted to the electronic device.

The electronic device that receives the above information may determine a density because the density is greater than zero. Then, based on the determined density and the received information, the electronic device may control the cooling and heating of the space.

When the electronic device is incapable of knowing the density information, the density may be first determined as described above in FIGS. 4A and 4B, and then the cooling/heating of the space may be controlled using the determined density and the received information.

On the other hand, when the density is zero, this may indicate that there is no person in the space. Thus, at step S550, the electronic device may calculate a setback temperature. The setback temperature may refer to a temperature that is set to reach a comfortable temperature when a person exists again in an empty space. The comfortable temperature may mean a temperature at which a person can feel comfort. The comfort may be a certain degree of a person's feeling affected by psychological factors and climatic factors such as temperature, relative humidity, wind, and sunshine amount. For example, when the temperature is about 22 degrees and the humidity is about 65%, it is considered that conditions of feeling comfort is satisfied.

However, the description herein is made on the assumption that the comfort is most affected by temperature from among the above various factors.

Then, at step S560, the electronic device may control the air conditioner of the space according to the setback temperature. A detailed method for setting the setback temperature when the density is determined to be zero will be described later.

The above-described method for transmitting the identification information of the space to the server and receiving the density information may be mainly used when the space is a closed space.

Figure 6:
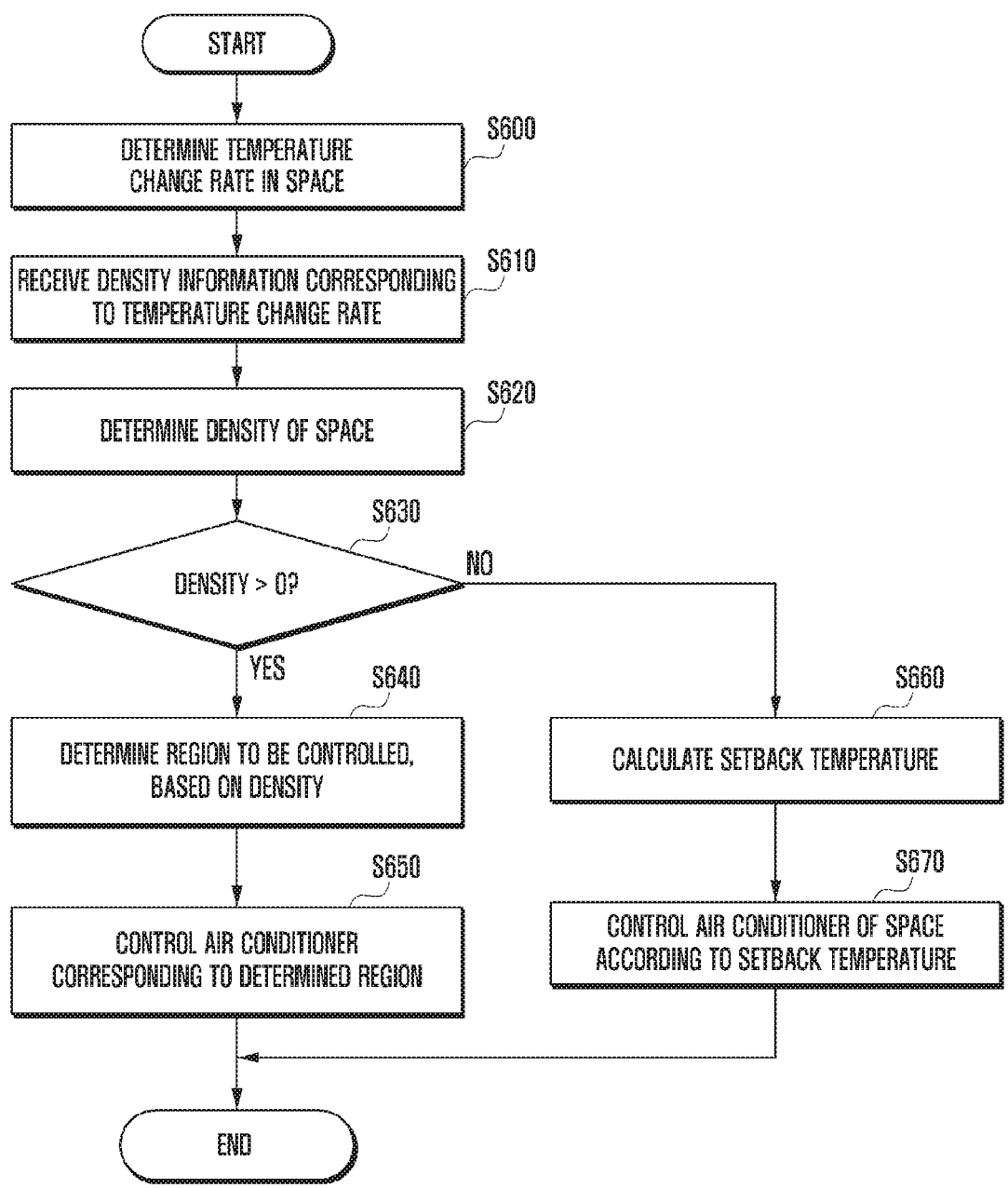
FIG. 6 is a flow diagram illustrating a method for determining a density and controlling cooling/heating based on the determined density, in case where identification information of a space is unknown, according to an embodiment of the present invention.

If the identification information of the space is unknown or if the space is open and thus incapable of being represented by identification information, the electronic device may control the cooling/heating of the space by a method as shown in FIG. 6.

At step S600, the electronic device may determine a temperature change rate in a space. For example, if the time to measure a temperature change is set to one minute, the electronic device may measure how much the temperature has changed for one minute.

Then, at step S610, the electronic device may receive density information corresponding to the temperature change rate from the control device or storage server. Through the method as described above, the electronic device may determine, from mapping information stored in the control device or storage server regarding an ambient air temperature, a space temperature, a temperature change rate, and a density, whether there is information matched with a currently detected temperature of an ambient air, a current temperature, and a current temperature change rate.

At step S620, the electronic device may determine the density of the space. When the electronic device transmits information about various detected temperatures to the control device or storage server, the control device or storage server may acquire, from stored information, the density information that is matched with the received information exists within an error range.

For example, the electronic device detects a current temperature (a starting point of a temperature change) of 25 degrees, an ambient air temperature of 32 degrees, and a temperature rising rate of 2 degrees, and then transmits the detected information to the control device or storage server. Then, the electronic device or control server may retrieve, from stored information, a density corresponding to the received information about temperatures and determine that the density is 0.5.

At step S630, the electronic device may determine whether the density is greater than zero. If the density is 0.5 in the above example, the electronic device may determine that the density is greater than zero. Thus, at step S640, the electronic device may determine a region to be controlled according to the density.

For example, the electronic device may sense the signal strength of a mobile device that is expected to be carried by a person. Then, the electronic device may determine a specific region having the signal strength greater than a threshold value as the region to be controlled according to the density.

Therefore, the electronic device may set a region having the signal strength greater than the threshold value as a control target region, and determine the density of the control target region as the received density of 0.5.

Then, at step S650, the electronic device may control an air conditioner corresponding to the determined region. Specifically, the control device or storage server may retrieve information indicating that when the current temperature (a starting point of a temperature change) is 25 degrees, and when the ambient air temperature is 32 degrees, the cooling strength is controlled to a "slightly weak" level at a density of 0.1 to 0.2, to a "medium" level at a density of 0.3, to a "strong" level at a density of 0.5, and when the ambient air temperature is 28 degrees, the cooling strength is controlled to a "strongest" level at a density of 0.6 to 0.8. Then, the retrieved information may be transmitted to the electronic device.

The electronic device that receives the above information may control the cooling and heating of the space by using the determined density and the received information.

Meanwhile, the electronic device may receive, from the control device or storage server, an air conditioning control command based on environmental information of the space as well as the density. Alternatively, when the electronic device includes a separate storage, the cooling/heating may be controlled according to environmental information, based on previously stored data.

For example, when many devices are recognized by the electronic device that measures the energy usage of the space or counts the number of devices connected to a network, the electronic device may control an air conditioner to increase the strength of cooling and decrease the strength of heating.

Also, when worker's attendance information is inputted in case of a space such as an office, the electronic device may acquire a command for controlling the cooling and heating so that the temperature of the space is within a proper temperature range. And also, when information about a worker's attendance time has been already entered in the electronic device, the electronic device may control the cooling and heating so that the temperature of the space is within a proper temperature range before the worker goes to work.

On the other hand, when worker's departure information is inputted, the electronic device may control the cooling and heating to be not performed even when the temperature becomes out of a proper temperature range.

In addition, if there is a previously entered meeting schedule in case of a space such as a conference room, the electronic device may control the air conditioner in accordance with the meeting schedule, even if the density is zero, so as to reach a proper temperature range at a meeting time.

If information about a cleaning time is inputted, the electronic device may control a ventilation mode of the air conditioner to be turned on.

In addition, the electronic device may acquire weather information from an external server such as a weather station server. In this case, the electronic device may receive weather information such as an ambient air temperature, rain, wind, and the like. For example, when weather information indicating rain is received, the electronic device may also execute a dehumidification mode of the air conditioner.

The above-described air conditioning control command may be generated by the control device or storage server that receives environmental information from the electronic device. Thus, the electronic device may receive the air conditioning control command from the control device or storage server and then perform the control of the air conditioner as described above.

Meanwhile, if it is determined at step S630 that the density is zero, the process may proceed to step S660. The electronic device may calculate a setback temperature at step S660, and then control the air conditioner in the space according to the setback temperature at step S670. A detailed method for setting the setback temperature when the density is determined to be zero will be described later.

Figure 7:
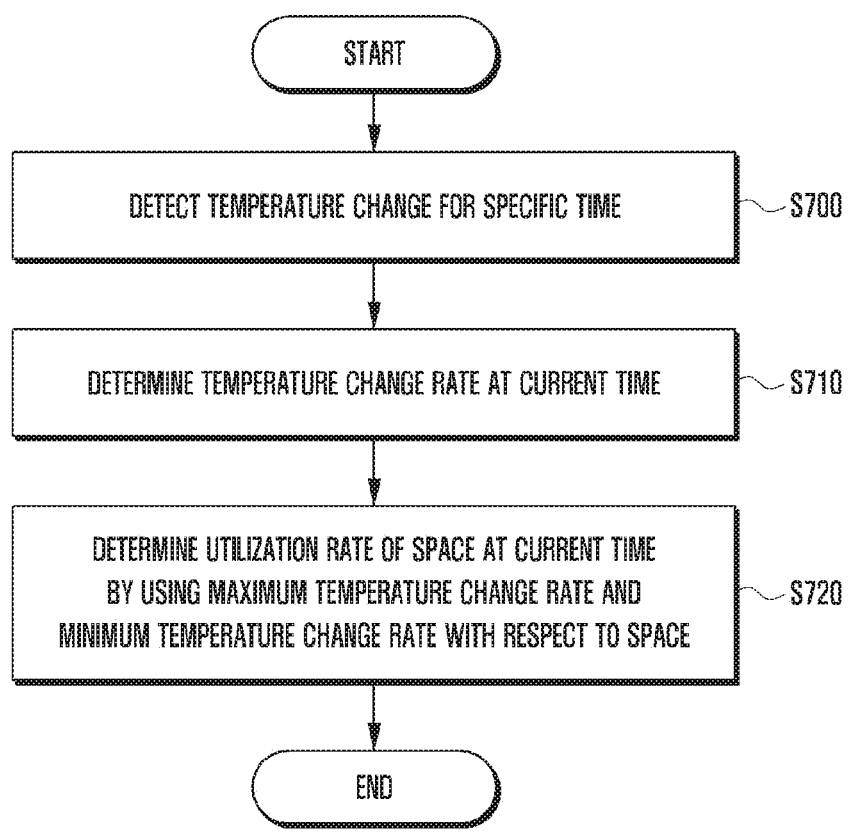
FIG. 7 is a flow diagram illustrating a method for determining a utilization rate according to an embodiment of the present invention.

FIG. 7 is a flow diagram illustrating a method for determining a utilization rate according to an embodiment of the present invention.

If the electronic device is incapable of determining the density by using data stored in the storage or information received from the server, the electronic device may infer the utilization rate of the space and use the inferred utilization rate instead of the density.

First, at step S700, the electronic device may detect a temperature change for a specific time. Then, at step S710, the electronic device may determine a temperature change rate at a current time.

For example, the electronic device may detect information indicating that a temperature rises 2 degrees for one minute and, as a result, currently reaches 27 degrees.

At step S720, the electronic device may determine the utilization rate of the space at the current time by using the maximum temperature change rate and the minimum temperature change rate with respect to the space. Specifically, the electronic device may acquire the maximum and minimum temperature change rates of the space and the density information at each temperature change rate from the control device or storage server.

For example, based on information collected in the space, the electronic device may acquire information that the maximum temperature change rate of the space is 5 degrees and the minimum temperature change rate is 0.2 degrees. In this case, the electronic device may assume a utilization amount of 100 when the maximum temperature change rate is 5 degrees, and a utilization amount of 0 when the minimum temperature change rate is 0.2 degrees.

Therefore, since the detected temperature change rate is 2 degrees, the electronic device may acquire, through proportional calculation, information that a current utilization rate of the space is about 41.67.

By the above-described method, the electronic device may use the inferred utilization rate instead of the density. For example, the electronic device may determine that the density is 0.42.

Figure 8:
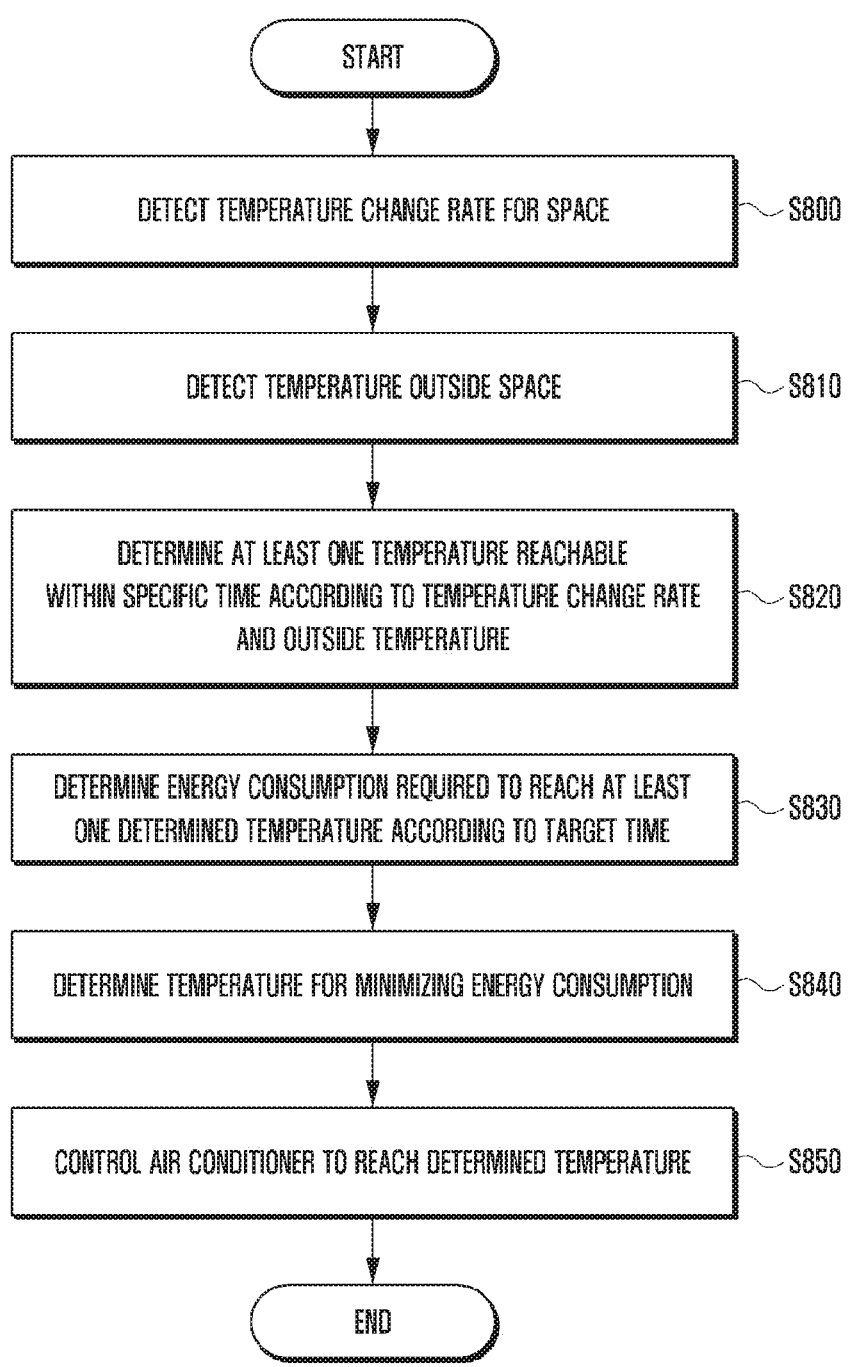
FIG. 8 is a flow diagram illustrating a method for setting a setback temperature according to an embodiment of the present invention.

FIG. 8 is a flow diagram illustrating a method for setting a setback temperature according to an embodiment of the present invention.

If the density or the utilization rate is determined to be zero, or if information indicating that the user is absent is inputted, the electronic device may set the setback temperature through a method described below.

First, at step S800, the electronic device may detect a temperature change rate with respect to a space. Then, at step S810, the electronic device may detect a temperature outside the space.

At step S820, the electronic device may determine at least one temperature reachable within a specific time according to the temperature change rate and the outside temperature, via information received from the storage or an external server.

For example, the electronic device may detect that the temperature has risen by 2 degrees for 10 minutes and the current temperature is 27 degrees at the current time of 2:20 pm.

The electronic device may receive stored information indicating, for example, that 6-degree lowered after 15 minutes, 5.3-degree lowered after 10 minutes, 2-degree lowered after 5 minutes, and 0.3-degree lowered after 1 minute in case of cooling set to the "maximum" level, 3-degree lowered after 10 minutes and 1.5-degree lowered after 5 minutes in case of cooling set to a "strong" level, 4-degree lowered after 15 minutes, 1.7-degree lowered after 10 minutes, and 1.2-degree lowered after 5 minutes in case of cooling set to a "medium" level, and 2-degree lowered after 20 minutes, 1.2-degree lowered after 15 minutes, and 0.4-degree lowered after 5 minutes in case of cooling set to a "weak" level.

At step S830, the electronic device may calculate energy consumption required to reach the at least one temperature according to a target time. The target time may be determined according to a schedule set in the electronic device.

For example, it is assumed that the space controlled by the electronic device is a conference room and there is input information indicating that the first meeting ends at 2:00 pm today and the second meeting starts at 2:30 pm.

The electronic device may detect that the temperature has risen 2 degrees from 2:10 to 2:20, so if the cooling is not performed until 2:30 pm that the second meeting starts, the electronic device may determine that there is an additional temperature rise. Therefore, the electronic device may determine a target time for controlling the cooling/heating of the conference room to be 2:30 so that attendee of the second meeting can feel comfortable when entering the room.

Specifically, based on the acquired information as described above, the electronic device may set the cooling to the "maximum" level to lower the temperature by 5.3 degrees after 10 minutes. In this case, the electronic device may determine that the expected temperature is 21.7 degrees which falls in a "comfort range", and the energy consumption for 10 minutes is "a".

In this case, the "comfort range" may mean a specific range of temperatures in which a person can feel comfort. The comfort may be a certain degree of a person's feeling affected by psychological factors and climatic factors such as temperature, relative humidity, wind, and sunshine amount. For example, when the temperature is about 22 degrees and the humidity is about 65%, it is considered that conditions of feeling comfort is satisfied. The comfort range may mean that the range of temperature is specified among various factors for feeling the above-mentioned comfort.

Also, the electronic device may set the cooling to the "strong" level to lower the temperature by 3 degrees after 10 minutes. In this case, the electronic device may determine that the expected temperature is 24 degrees which falls in the "comfort range", and the energy consumption for 10 minutes is "b".

On the other hand, if the electronic device sets the cooling to the "medium" level and thereby the temperature is lowered by 1.7 degrees after 10 minutes, the electronic device may determine that the expected temperature is 25.3 degrees which does not fall in the "comfort range". In this case, the energy consumption may not be calculated.

Also, the electronic device may set the cooling to the "medium" level to lower the temperature by 1.2 degrees after 5 minutes, and then set the cooling to the "maximum" level to further lower the temperature by 2 degrees for 5 minutes. In this case, the electronic device may determine that the expected temperature is 23.8 degrees which falls in the "comfort range", and the energy consumption for 10 minutes is "c".

As described above, the electronic device may calculate the energy consumption according to various cooling levels and cooling times. Then, at step S840, the electronic device may determine a temperature for minimizing the energy consumption.

For example, in the above example, it is assumed that the smallest value among energy consumption amounts "a", "b", and "c" is "b". Therefore, the electronic device may determine a setback temperature of 24 degrees which corresponds to the "comfort range" with less energy consumption.

At step S850, the electronic device may control the air conditioner to reach the determined temperature. As described above, when "b" is the smallest value, even if the density is zero, the electronic device may control the air conditioner on the "strong" level for 10 minutes from 2:20 such that the temperature of the space can reach the setback temperature of 24 degrees at the target time, 2:30.

Figure 9A:
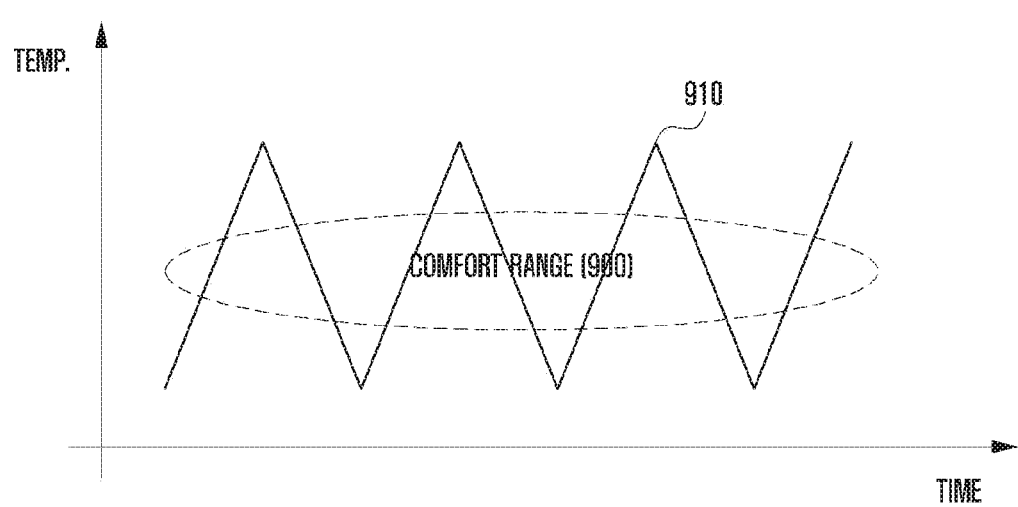
FIGS. 9A and 9B are graphs showing a temperature change rate by control of cooling/heating.
Figure 9B:
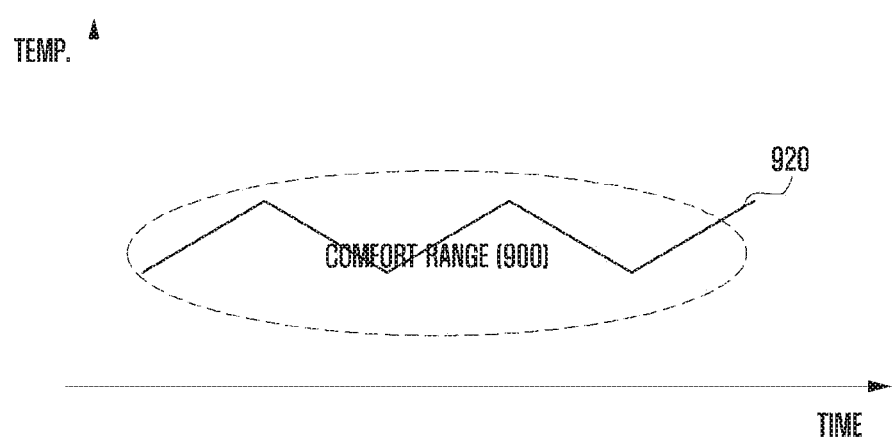

FIGS. 9A and 9B are graphs showing a temperature change rate by control of cooling/heating.

According to an embodiment, the "comfort range" shown in FIGS. 9A and 9B represents a range in which the user feels comfortable.

FIG. 9A is a graph showing the rate of temperature change in case where the air conditioner is operated without considering the density, despite the high density. When the cooling operation is started in response to a temperature increase without considering the density, and the cooling operation is stopped or the heating operation is started in response to a temperature decrease, the temperature may be out of the "comfort range" as shown in a graph 910 of FIG. 9A.

On the other hand, when the cooling and heating of the space are controlled by considering at least one of the density and the ambient air temperature as described above, it is possible to control the temperature of the space within the "comfort range" as shown in FIG. 9B.

For example, if it is determined that the density is greater than zero and the temperature of the space is within the "comfort range" by the heating/cooling control, the electronic device may control the air conditioner to stop operation.

When the operation of the air conditioner is stopped, the electronic device may detect the temperature change rate of the space and the outside temperature for a preset time.

If it is detected that the temperature of the space is out of the "comfort range", the electronic device may resume the operation of the air conditioner.

As described above, the electronic device may measure the temperature change rate of the space when the operation of the air conditioner starts or stops depending on the density and the outside temperature, and store the measured result in the storage thereof or transmit it to the server.

Then, based on data stored as described above, the electronic device may control the temperature of the space not to deviate from the "comfort range" according to the determined density and the measured outside temperature.

Figure 10:
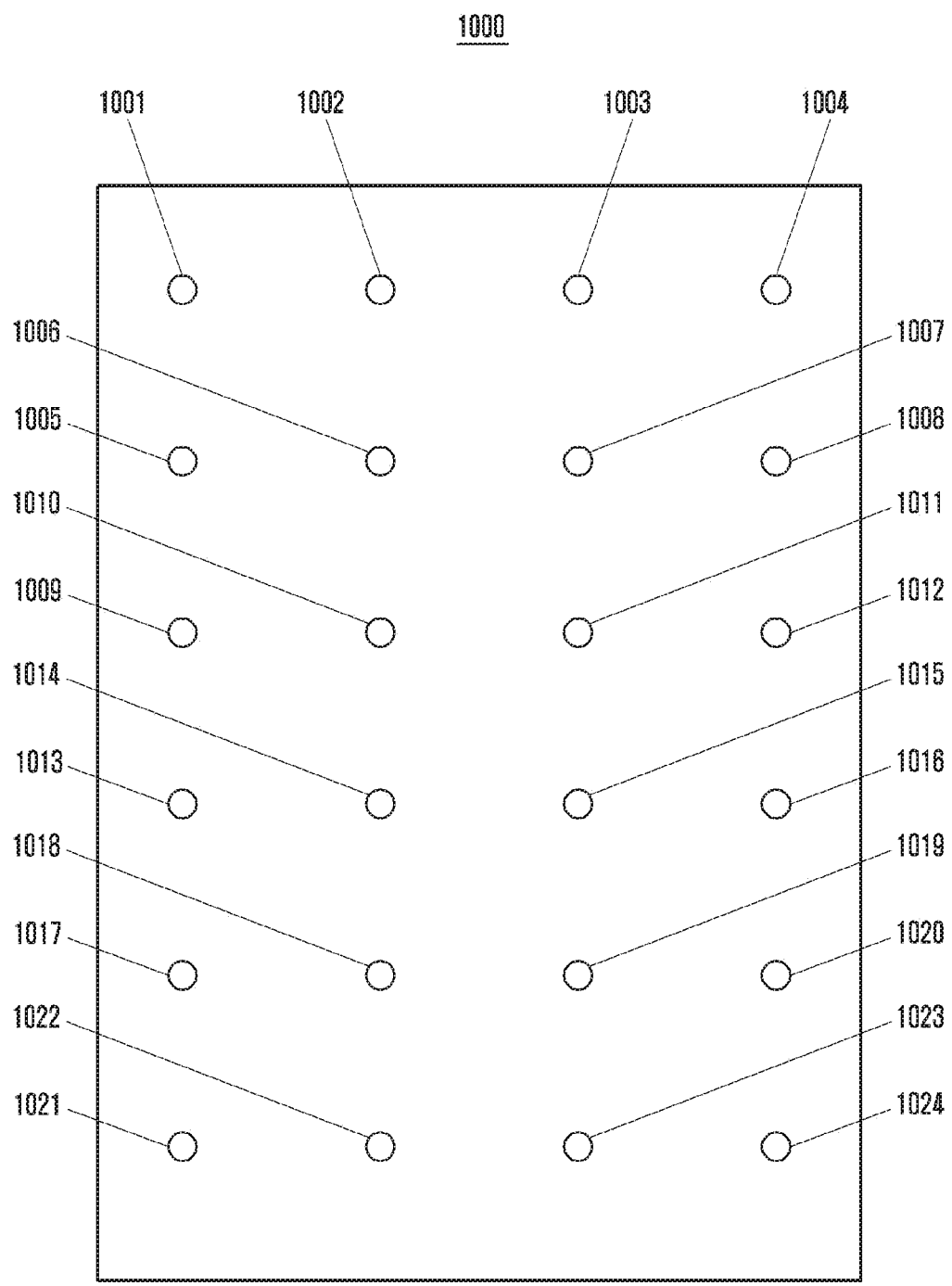
FIG. 10 is a diagram illustrating a case where a plurality of air conditioners exist, according to an embodiment of the present invention.

FIG. 10 is a diagram illustrating a case where a plurality of air conditioners exist, according to an embodiment of the present invention. For example, when the space controlled by the electronic device is an office, the first air conditioner 1001 through the 24th air conditioner 1024 may be disposed on an office ceiling at regular intervals as shown.

Figure 11:
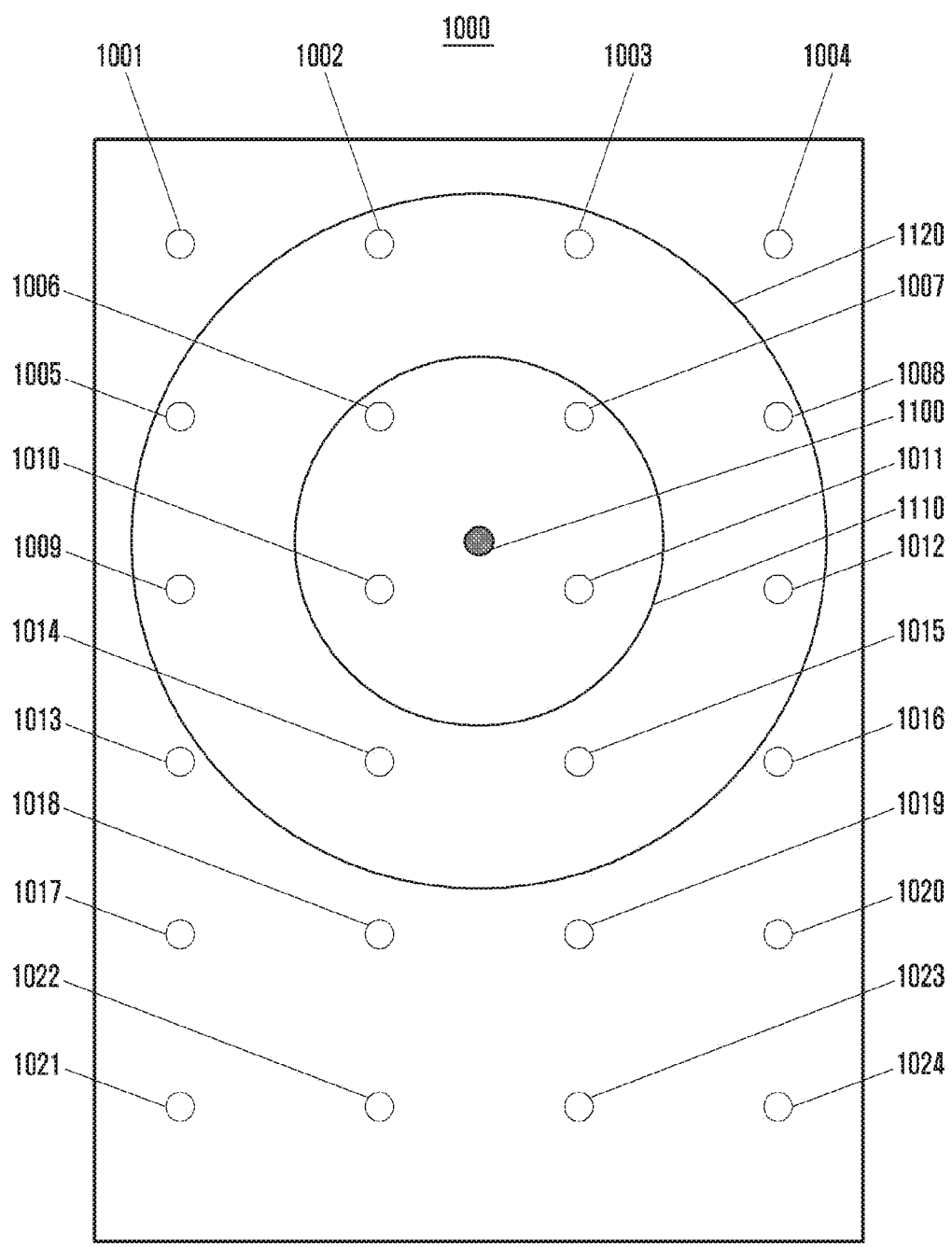
FIG. 11 is a diagram illustrating a method for setting a cooling/heating control region when a plurality of air conditioners exist, according to an embodiment of the present invention.

FIG. 11 is a diagram illustrating a method for setting a cooling/heating control region when the plurality of air conditioners exist as shown in FIG. 10.

In FIG. 11, a reference numeral 1100 denotes a location where the density is detected as being greater than zero. When the density exceeds zero at one location in a relatively large space such as an office and the density is zero in the remaining region, the efficiency is degraded if the electronic device operates all the air conditioners 1001 to 1024.

Therefore, the electronic device may control the cooling and heating for the first location 1110 the density of which is detected as exceeding zero. Depending on control results, 0, the electronic device may change a control target region to the second location 1120.

Figure 12:
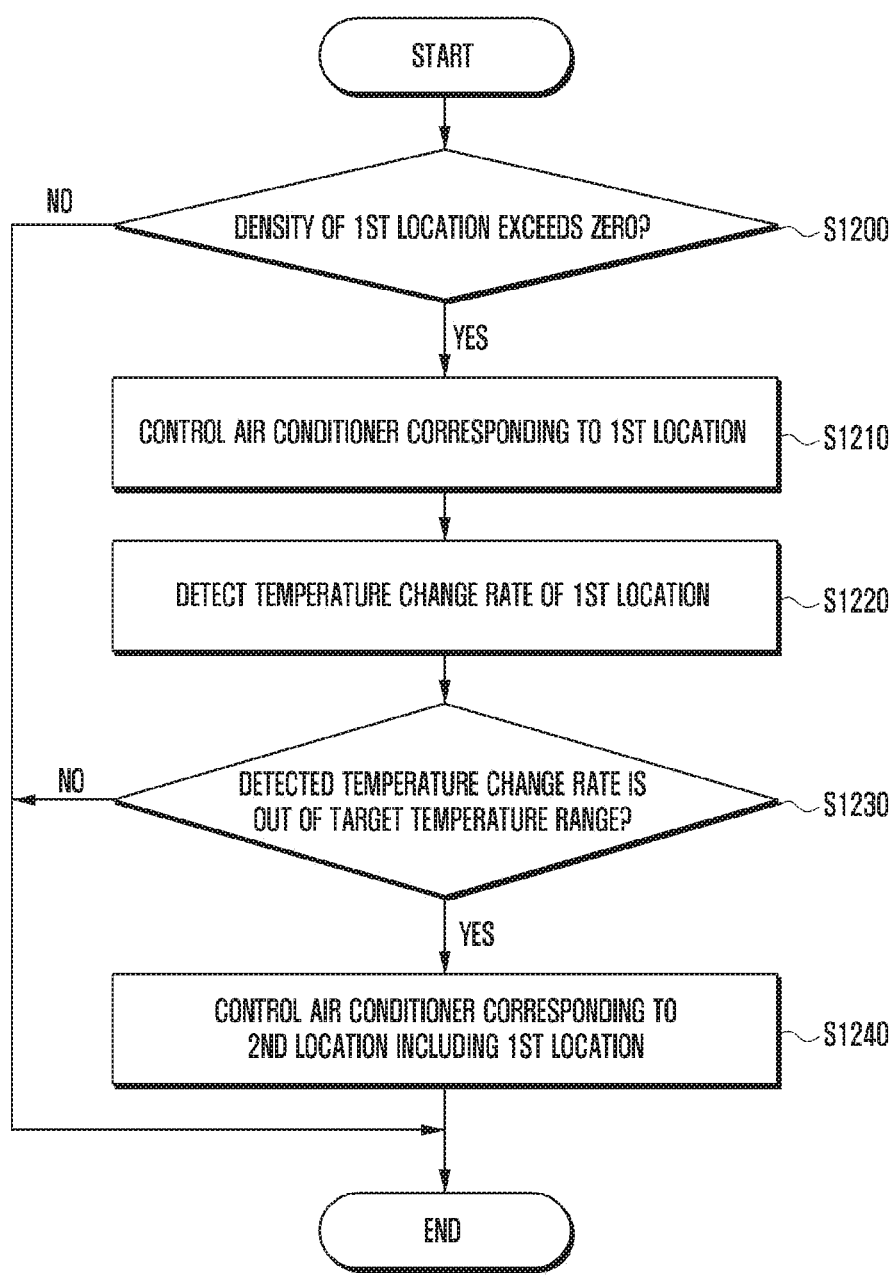
FIG. 12 is a diagram illustrating a method for setting a cooling/heating control region when a plurality of air conditioners exist, according to an embodiment of the present invention.

Specifically, this will be described with reference to a flow diagram shown in FIG. 12. First, at step S1200, the electronic device may determine whether the density of the first location exceeds zero. If it is determined that the density of the first location exceeds zero, the electronic device may control the air conditioner corresponding to the first location at step S1210. Specifically, as described above, the electronic device may detect at least one of the temperature change rate at the first location and the ambient air temperature, receive information related to the detected at least one of the temperature change rate and the ambient air temperature from the storage or the server, and determine the density. Then, based on the determined density, the electronic device may control the air conditioner corresponding to the first location.

In addition, the electronic device may detect the temperature change rate of the first location at step S1220, and then determine at step S1230 whether the temperature of the first location according to the detected temperature change rate is out of a target temperature range. For example, the target temperature range may be the above-described "comfort range". In another example, the target temperature range may be a setting temperature selected by the user.

If it is determined that the temperature of the first location does not fall within the target temperature range, the electronic device may control the air conditioner corresponding to the second location including the first location at step S1240.

Specifically, when the temperature of the first location is out of the target temperature range due to a temperature change of the first location, the electronic device may determine that the operation of many air conditioners is required to control the temperature of the first location because the density of the first location is high.

Thus, if the temperature of the first location does not fall within the target temperature range as the temperature changes at the first location, the electronic device may control the air conditioner corresponding to the second location which is a larger region including the first location.

Figure 16:
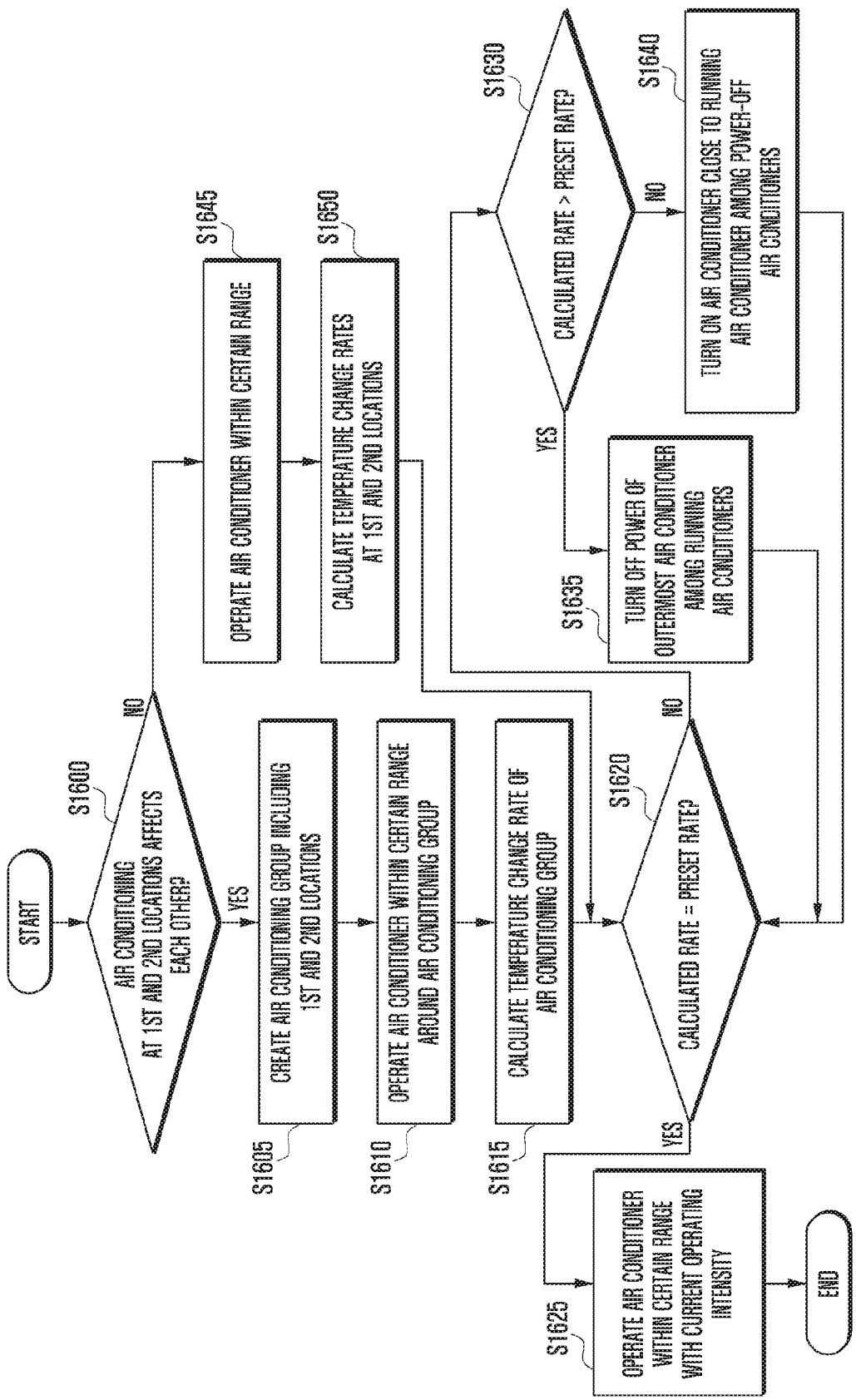
FIG. 16 is a flow diagram illustrating a method for setting a cooling/heating control region when there are a plurality of locations having a density exceeding zero in a space where a plurality of air conditioners exist, according to an embodiment of the present invention.

Meanwhile, FIG. 16 is a flow diagram illustrating a method for controlling an air conditioner when at least two locations such as first and second locations having a density exceeding zero are detected in a space where a plurality of air conditioners exist, according to another embodiment of the present invention.

If it is determined that the density is greater than zero at the first and second locations as described above, the electronic device may determine at step S1600 whether air conditioning at the first and second locations affects each other.

Figure 17A:
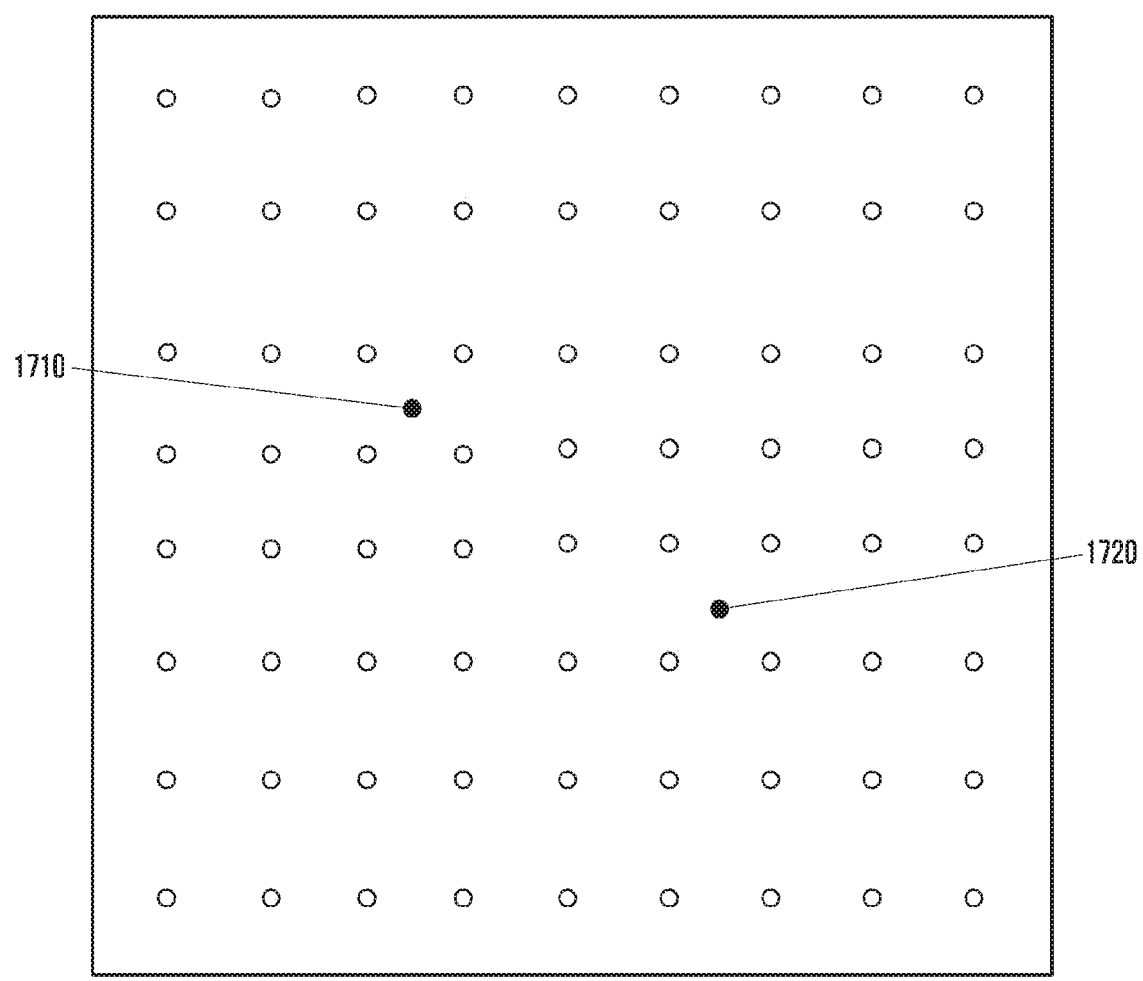
FIG. 17A to 17C are diagrams illustrating a space in which a plurality of locations with a density exceeding zero are detected and a plurality of air conditioners exist, according to an embodiment of the present invention.

For example, as shown in FIG. 17A, if it is determined that each of a first location 1710 and a second location 1720 has the density exceeding zero in a space 1700, the electronic device may detect the temperature change rate at the second location 1720 to determine whether air conditioning at the first and second locations affects each other when the air conditioner is running at the first location 1710. Specifically, the electronic device may first start the operation of the air conditioner at the first location 1710 and then determine whether the temperature of the second location 1720 changes within a preset time (e.g., one minute). If the temperature of the second location 1720 changes, the electronic device may determine that the operation of the air conditioners at the first and second locations 1710 and 1720 affects each other.

Alternatively, when the electronic device starts the operation of the air conditioner at the second location 1720 and thereby the temperature of the first location 1710 changes within a preset time, the electronic device may determine that the operation of the air conditioners at the first and second locations 1710 and 1720 affects each other.

If it is determined that the operation of the air conditioners at the first and second locations 1710 and 1720 affects each other, the electronic device may create at step S1605 an air conditioning group including the first and second locations 1710 and 1720.

Figure 17B:
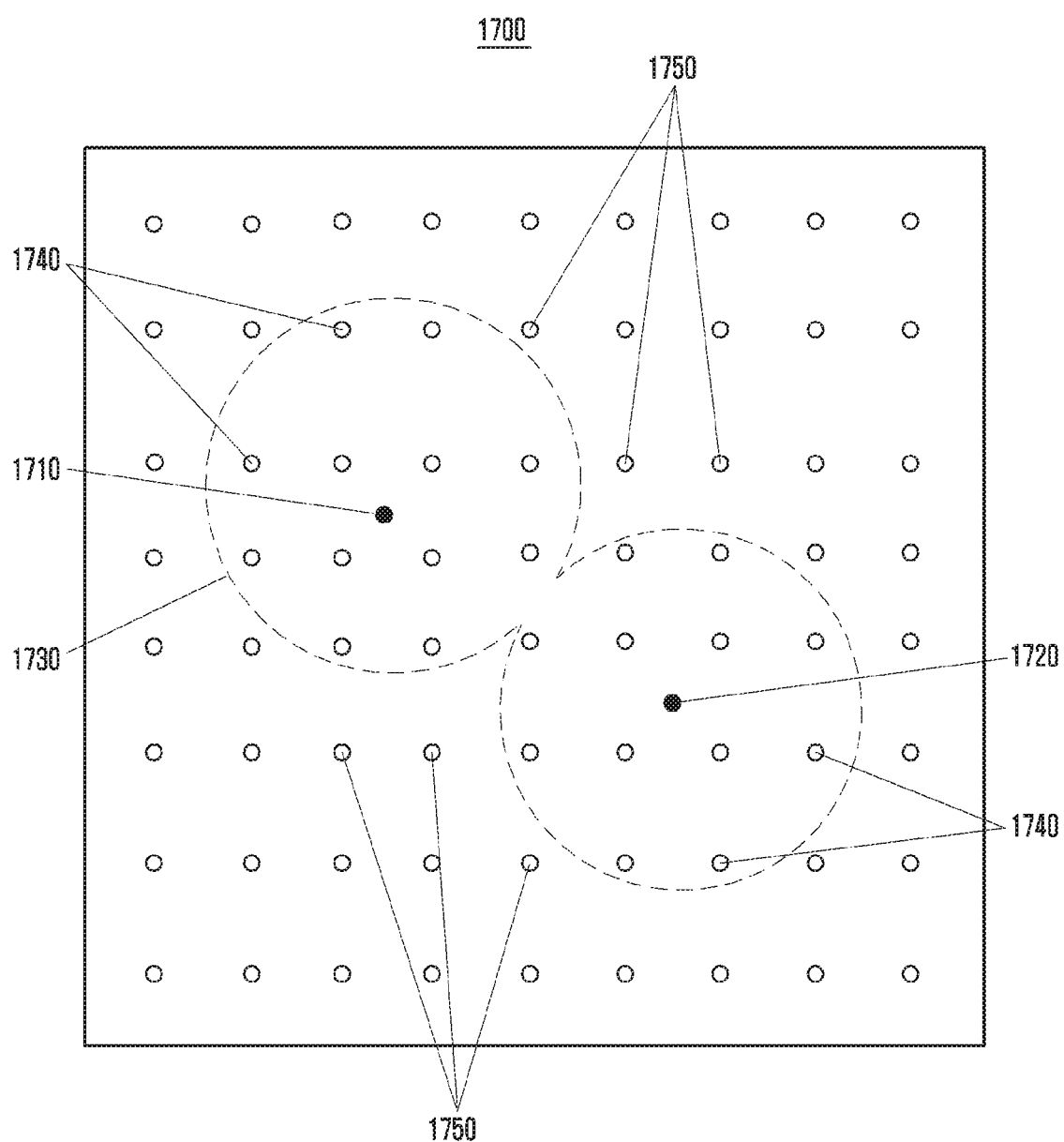

Then, at step S1610, the electronic device may operate the air conditioners within a certain range around the air conditioning group. For example, as shown in FIG. 17B, the electronic device may operate the air conditioners 1730 existing within a certain distance from each of the first and second locations 1710 and 1720 which are determined as one air conditioning group.

Returning to FIG. 16, at step S1615, the electronic device may calculate the temperature change rate of the air conditioning group caused by the operation of the air conditioners 1730.

At step S1620, the electronic device may determine whether the temperature change rate is equal to a preset rate of change. For example, when a target temperature is 23 degrees and a current temperature is 25 degrees, the electronic device may determine that the temperature of the air conditioning group is lowered by 0.1 degree per minute by cooling of the air conditioners 1730. At this time, if the determine rate of temperature change, 0.1 degrees per minute, is equal to the preset rate of change, the electronic device may operate at step S1625 the air conditioners within a certain range with the current operating intensity.

Meanwhile, the electronic device may adjust the preset rate of change, depending on the target temperature and the current temperature. For example, if a difference between the target temperature and the current temperature is 3 degrees or less, the electronic device may set the change rate to 0.1 degrees per minute. Also, if a difference between the target temperature and the current temperature is more than 3 degrees and equal to or less than 5 degrees, the electronic device may set the change rate to 0.3 degrees per minute. And also, if a difference between the target temperature and the current temperature is more than 5 degrees and equal to or less than 7 degrees, the electronic device may set the change rate to 0.6 degrees per minute. In other words, the electronic device may set the change rate to be greater as a difference between the target temperature and the current temperature is greater.

If it is determined at step S1620 that the temperature change rate is not equal to the preset rate of change, the electronic device may determine at step 1630 whether the temperature change rate exceeds the preset rate of change. If the temperature change rate exceeds the preset rate of change, this may mean that the temperature of the air conditioning group is more likely to exceed the target temperature.

Accordingly, if the temperature change rate exceeds the preset rate of change, the electronic device may turn off at step S1635 the power of the outermost air conditioner among the air conditioners in operation. For example, from among the air conditioners 1730 shown in FIG. 17B, the electronic devices may turn off the power of air conditioners 1740 which are farthest from each other. In addition, the electronic device may turn off the power of the air conditioners 1740 one by one or all of them. Turning off the power of the air conditioners 1740 shown in FIG. 17B is exemplary only. If the number of the running air conditioners 1730 is sufficiently large, the electronic device may turn off the power of a plurality of air conditioners disposed outside the air conditioners 1730.

On the other hand, if the temperature change rate does not exceed the preset rate of change, that is, if the temperature change rate is less than the preset rate of change, the electronic device may determine that further cooling or heating is required.

Thus, at step S1640, the electronic device may turn on the power of at least one air conditioner which is close to the running air conditioners, from among power-off air conditioners. For example, in FIG. 17B, the electronic device may turn on the power of air conditioners 1750 adjacent to the air conditioners 1730. At this time, the electronic device may turn on the power of the air conditioners 1750 one by one or all at once. Turning on the power of the air conditioners 1750 shown in FIG. 17B is exemplary only, and the electronic device may turn on the power of a plurality of air conditioners disposed outside the running air conditioners 1730.

While performing steps S1635 and S1640, the electronic device may detect the temperature change rate. Then, the electronic device may perform step S1620 again to determine whether the detected temperature change rate is equal to the preset rate of change.

On the other hand, if it is determined at step S1600 that the first location 1710 and the second location 1720 do not affect each other, the electronic device may operate at step S1645 the air conditioner within a certain range. In this case, a certain range may mean a predetermined distance from each of the first and second locations 1710 and 1720.

Figure 17C:
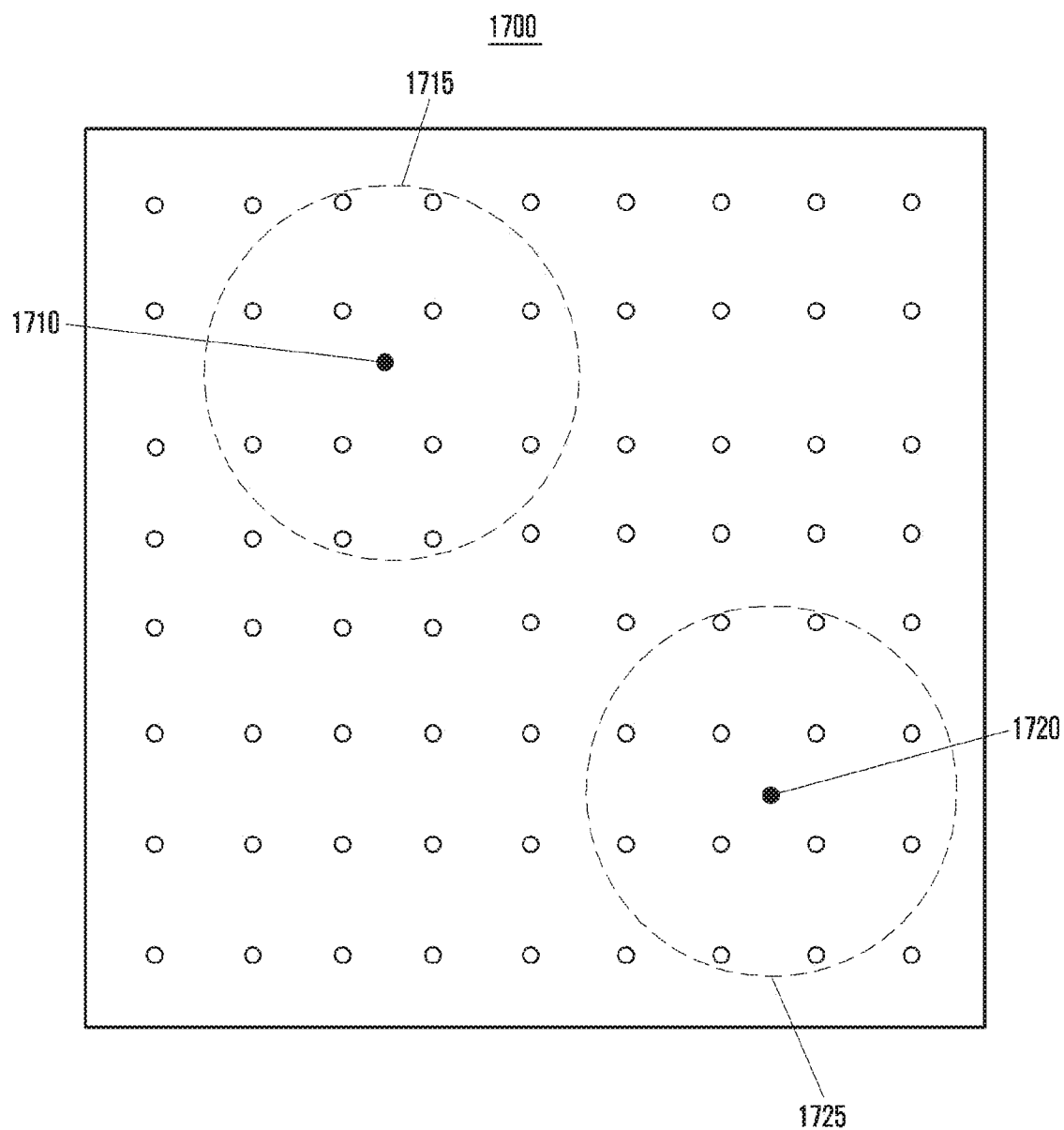

For example, FIG. 17C shows a case where the first location 1710 and the second location 1720 do not affect each other. Specifically, if the temperature change rate of the second location 1720 is zero or does not exceed a threshold value even exceeding zero when the air conditioner of the first location 1710 is running, this may be determined that the first and second locations 1710 and 1720 do not affect each other.

In this case, the electronic device may operate one or more air conditioners 1715 existing within a certain distance from the first location 1710. At the same time, the electronic device may operate one or more air conditioners 1725 existing within a certain distance from the second location 1720.

Then, at step S1650, the electronic device may calculate the temperature change rate of the first location 1710 and control the air conditioners 1715 around the first location 1710 through a process at and after step S1620.

In addition, the electronic device may calculate the temperature change rate of the second location 1720 and control the air conditioners 1725 around the second location 1720 through a process at and after step S1620.

According to the above-described method, when at least one person exists in a space where a plurality of air conditioners are installed, the electronic device may efficiently control the temperature of the space by using at least one air conditioner.

Figure 13:
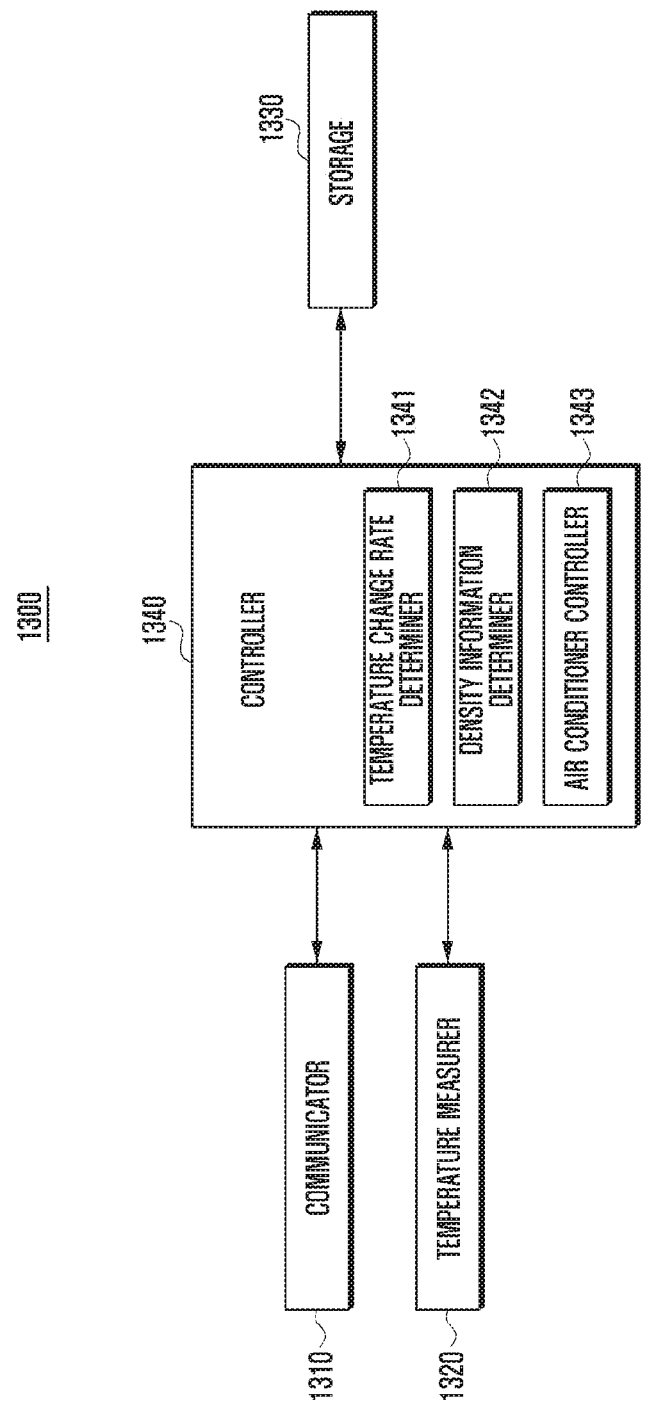
FIG. 13 is a block diagram illustrating elements of an electronic device that controls cooling/heating of a space, according to an embodiment of the present invention.

Meanwhile, FIG. 13 is a block diagram illustrating elements of an electronic device that controls cooling/heating of a space, according to an embodiment of the present invention. The electronic device 1300 for controlling the cooling/heating of the space may include one or more gateways that receive control commands from a server or control device for controlling air conditioners of divided regions in the space and also transmit information about the environment of the divided regions to the server.

The electronic device 1300 may include a communicator 1310, a temperature measurer 1320, a storage 1330, and a controller 1340.

The communicator 1310 may perform wired or wireless communication with an external storage, a server, or an air conditioner. Specifically, the electronic device 1300 may receive mapping information of an ambient air temperature, a detected space temperature, and a temperature change rate from the external server through the communicator 1310. Also, the electronic device 1300 may transmit a control command to the air conditioner through the communicator 1310.

The temperature measurer 1320 may measure a temperature of a space controlled by the electronic device 1300 and a temperature outside the space. For example, the temperature measurer 1320 may include a plurality of temperature sensors. Thus, through the temperature measurer 1320, the electronic device 1300 may detect the temperature of the space, the temperature of a certain region of the space, and the temperature of an ambient air.

The storage 1330 is an element for storing various kinds of information. Although the storage 1330 may be included in the electronic device 1300 as shown in FIG. 13, this is exemplary only. Alternatively, the electronic device 1300 may store various kinds of information in an external storage server or database.

Meanwhile, the controller 1340 may generally control the electronic device 1300. The controller 1340 may include at least one hardware module such as a temperature change rate determiner 1341, a density information determiner 1342, and an air conditioner controller 1343. This is, however, exemplary only, and such a module may be implemented as software, an application, or a program.

The controller 1340 may determine a temperature change rate by measuring a temperature change for a predetermined first time through the temperature change rate determiner 1341. Also, from a temperature change rate and density information stored in the storage 1330, the controller 1340 may determine first density information corresponding to the determined temperature change rate through the density information determiner 1342.

The controller 1340 may control the cooling and heating of the space through the air conditioner controller 1343, based on the determined first density information. For example, the controller 1340 may transmit a control command for controlling the air conditioner through the communicator 1310.

Herein, the density information may refer to information about the ratio of heating entities to a space controlled by the electronic device. According to an embodiment, the heating entity may mean a user. However, this is exemplary only, and the heating entities may include an animal such as a dog or cat and an electronic device such as an illuminator or electrical appliances.

In addition, the controller 1340 may control the communicator 1310 to transmit identification information of the space controlled by the electronic device 1300 to the server and also to transmit the temperature change rate to the server.

Also, the controller 1340 may control the communicator 1310 to receive, from the server, second density information determined based on the identification information and the temperature change rate.

Based on the second density information, the controller 1340 may control the cooling and heating of the space.

Meanwhile, the controller 1340 may control the communicator 1310 to transmit the temperature change rate to the server and to receive third density information corresponding to the temperature change rate from the server. If the third density information is greater than zero, the controller 1340 may determine at least one air conditioner to control the cooling/heating based on the third density information, and thereby control the determined air conditioner.

In addition, the controller 1340 may detect the density of a space controlled by the electronic device and the temperature of an ambient air, detect the temperature change of the space for a reference time, and calculate a temperature change rate. Then, the controller 1340 may map the detected density, the ambient air temperature, and the calculated temperature change rate with respect to the space, and then store a mapping result in the storage 1330.

Meanwhile, based on the matching information stored in the storage 1330 regarding the detected density, the ambient air temperature, and the calculated temperature change rate, the controller 1340 may detect, as first density information, the density information corresponding to the determined temperature change rate.

When the density is zero in the first density information, the controller 1340 may detect the temperature of the space controlled by the electronic device, determine a temperature reachable within a preset time and related energy consumption information on the basis of the detected temperature, and determine a setting temperature based on a target time and the energy consumption information.

In addition, the controller 1340 may detect the space temperature and the ambient air temperature at regular intervals, and control the communicator 1310 to transmit the detected temperatures to the server and to receive, from the server, information about at least one temperature reachable within a preset time in accordance with the detected temperatures. Also, the controller 1340 may calculate the energy consumption required to reach the received at least one temperature, and determine the setting temperature based on the target time and the energy consumption information.

If the density is greater than zero in the first density information, the controller 1340 may detect a temperature change rate for a preset time and an ambient air temperature, and control the communicator 1310 to transmit the detected information to the server and to receive, from the server, cooling/heating control information in accordance with the density, the temperature change rate, and the ambient air temperature. Then, based on the received control information, the controller 1340 may control the air conditioner.

Meanwhile, the controller 1340 may detect a first region having a density greater than zero and a temperature of the first region, and then control the air conditioner corresponding to the first region. Also, the controller 1340 may determine whether a difference between the temperature of the first region and a target temperature exceeds a threshold temperature. If it is determined that the difference exceeds the threshold temperature, the controller 1340 may control the air conditioner corresponding to the second region including the first region.

As described above, the electronic device may efficiently control the temperature of the space by reflecting the density of the space and the temperature of the ambient air.

Figure 14:
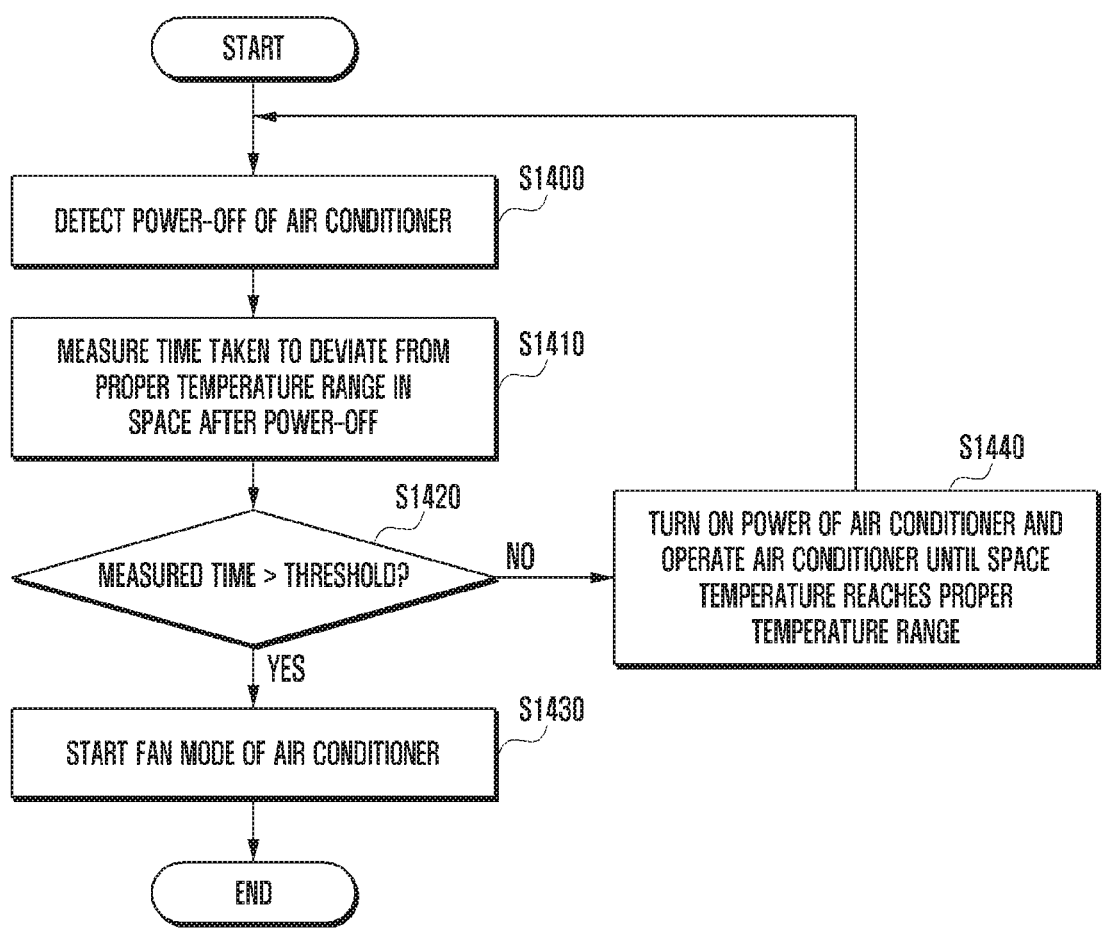
FIG. 14 is a flow diagram illustrating a method for an electronic device to control an air conditioner in a fan mode according to an embodiment of the present invention.

Meanwhile, FIG. 14 is a flow diagram illustrating a method for an electronic device to control an air conditioner in a fan mode according to an embodiment of the present invention.

First, at step S1400, the electronic device may detect that the power of an air conditioner is turned off. For example, the electronic device may detect that the air conditioner is powered off by a user command or setting.

At step S1410, the electronic device may measure a time required to deviate from a proper temperature range in a space after the power is turned off. For example, it is assumed that the proper temperature range the space is from 18 degrees to 24 degrees by setting, the current temperature is 20 degrees when the power is turned off, and it is winter. If the space has thick walls, a few windows, and a high density because of many heating entities, and if the temperature of the space is lowered below 18 degrees for 40 minutes, the electronic device may measure the required time as 40 minutes.

Then, at step S1420, the electronic device may determine whether the measured time exceeds a threshold time. For example, it is assumed that the threshold time is 30 minutes. Since the measured required time of 40 minutes exceeds the threshold time, the electronic device may control at step S1430 the air conditioner to start a fan mode.

During the fan mode, the electronic device may detect a change in temperature of the space. Then, the detected information may be stored in the storage or transmitted to the control device or the storage server.

On the other hand, if it is determined at step S1420 that the measured time does not exceed the threshold time, the electronic device may perform step S1440. That is, the electronic device may turn on the power of the air conditioner and operate the air conditioner until the temperature of the space reaches the proper temperature range.

According to another embodiment, the electronic device may measure a time taken for the temperature of the space to deviate from the proper range and transmit the measured time to the control device or the storage server. Then, the control device or the storage server may determine whether the measured time exceeds the threshold time. Based on a determination result, the control device or the storage server may transmit a cooling/heating control command to the electronic device.

Figure 15:
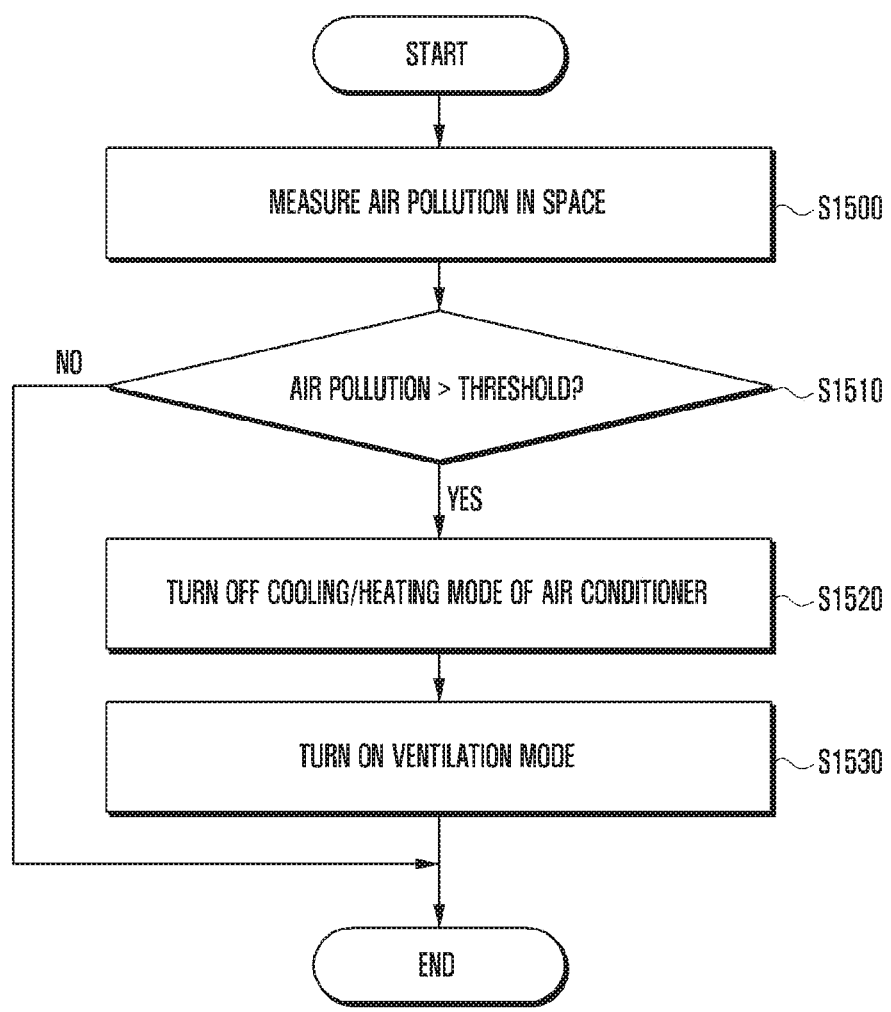
FIG. 15 is a flow diagram illustrating a method for an electronic device to control an air conditioner in a ventilation mode according to an embodiment of the present invention.

Meanwhile, FIG. 15 is a flow diagram illustrating a method for an electronic device to control an air conditioner in a ventilation mode according to an embodiment of the present invention.

First, at step S1500, the electronic device may measure an air pollution degree of the space. For example, the electronic device may include a separate sensor for measuring air pollution and measure the air pollution degree of the space by using the sensor.

At step S1510, the electronic device may determine whether the measured air pollution degree exceeds a threshold value. If it is determined that the measured air pollution degree exceeds the threshold value, the electronic device may perform step S1520.

At step S1520, the electronic device may turn off a cooling/heating mode of the air conditioner. For example, if it is determined that the air pollution degree exceeds the threshold value during a cooling mode, the electronic device may turn off the cooling mode. Similarly, if it is determined that the air pollution degree exceeds the threshold value during a heating mode, the electronic device may turn off the heating mode.

Then, at step SS1530, the electronic device may turn on a ventilation mode. The ventilation mode may refer to a mode of controlling the air in the space to circulate with the ambient air.

The electronic device may turn on the cooling/heating mode again after operating the ventilation mode for a preset time. Alternatively, after operating the ventilation mode for a preset time, the electronic device may measure the air pollution degree again. In this case, the electronic device may perform again the above process from step S1500.

According to the above-described method, when the air pollution degree in the space exceeds the threshold value, the electronic device may control to preferentially turn on the ventilation mode even if the temperature of the space is slightly different from the setting temperature.

Meanwhile, a program code for carrying out the air conditioning control method of the electronic device according to various embodiments as described above may be stored in a non-transitory computer readable medium. The non-transitory computer readable medium is not a medium such as a register, a cache, or a memory for storing data for a short time, but means a medium that semi-permanently stores data and can be read by a device. In particular, various applications or programs described above may be stored and provided on a non-transitory computer readable medium such as CD, DVD, hard disk, Blu-ray disk, USB, memory card, ROM, or the like.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

The invention claimed is:

1. An air-conditioning control method of an electronic device, the method comprising:
   identifying a temperature in a space;
   determining a temperature change rate of the space, the temperature change rate being a temperature change measured for a predetermined time period;
   acquiring density information by matching environmental information for the space with stored location information based on the temperature change rate of the space, wherein the stored location information comprises mapping information of the temperature change rate and the density information for the space identified by the location information; and
   controlling air-conditioning according to the density information and the environmental information;
   wherein the environmental information includes usage of devices in the space, situation information of the space, and external situation information of the space; and
   wherein the density information includes information on a ratio of heating entities to a space controlled by the electronic device.

2. The method of claim 1, further comprising:
   acquiring the density information corresponding to the temperature change rate from a control device or a storage server.

3. The method of claim 1, further comprising:
   transmitting the location information to a server;
   receiving, from the server, the mapping information of the temperature change rate and the density information for the space identified by the location information; and
   determining the density information for the space based on the received mapping information.

4. The method of claim 1, further comprising:
determining a setback temperature to be reached for the space at a target time based on a density of an area being identified to be zero by the density information; and
controlling the air-conditioning in the operating mode for minimizing energy consumption, until the temperature of the area reaches the setback temperature before the target time.

5. The method of claim 1, wherein controlling the air-conditioning comprises:
determining at least one air conditioner for the space according to the density information; and
controlling the determined at least one air conditioner.

6. An electronic device for air-conditioning control, the electronic device comprising:
a controller configured to:
identify a temperature in a space,
determine a temperature change rate of the space, the temperature change rate being a temperature change measured for a predetermined time period,
acquire density information by matching environmental information for the space with stored location information based on the temperature change rate of the space, wherein the stored location information comprises mapping information of the temperature change rate and the density information for the space identified by the location information, and
control air-conditioning according to the density information and the environmental information,
wherein the environmental information includes usage of devices in the space, situation information of the space, and external situation information of the space; and
wherein the density information includes information on a ratio of heating entities to a space controlled by the electronic device.

7. The electronic device of claim 6, wherein the controller is further configured to acquire the density information corresponding to the temperature change rate from a control device or a storage server.

8. The electronic device of claim 6, further comprising:
a transceiver,
wherein the controller is further configured to:
control the transceiver to transmit the location information to a server and to receive, from the server, the mapping information of the temperature change rate and the density information for the space identified by the location information, and determine the density information for the space based on the received mapping information.

9. The electronic device of claim 6, wherein the controller is further configured to determine a setback temperature to be reached for the space based on the density of an area being identified to be zero by the density information, and control the air-conditioning in an operating mode minimizing energy consumption, until the temperature of the area reaches the setback temperature before the target time.

10. The electronic device of claim 6, wherein the controller is further configured to determine at least one air conditioner in the space according to the density information and to control the determined at least one air conditioner.

* * * * *